US010030633B2

(12) United States Patent
Sigurdsson

(10) Patent No.: US 10,030,633 B2
(45) Date of Patent: Jul. 24, 2018

(54) SYSTEMS AND METHODS FOR TRANSPORTING WIND TURBINE BLADES

(71) Applicant: BNSF Logistics, LLC, Springdale, AR (US)

(72) Inventor: Sigurd Ernir Sigurdsson, Reykjavik (IS)

(73) Assignee: BNSF Logistics, LLC, Springdale, AR (US)

( * ) Notice: Subject to any disclaimer, the term of this patent is extended or adjusted under 35 U.S.C. 154(b) by 0 days.

(21) Appl. No.: 15/153,325

(22) Filed: May 12, 2016

(65) Prior Publication Data

US 2016/0258422 A1 Sep. 8, 2016

Related U.S. Application Data

(63) Continuation-in-part of application No. 14/595,288, filed on Jan. 13, 2015, now Pat. No. 9,494,140.

(60) Provisional application No. 61/928,066, filed on Jan. 16, 2014, provisional application No. 62/161,387, filed on May 14, 2015.

(51) Int. Cl.
*B60P 7/08* (2006.01)
*F03D 13/40* (2016.01)

(52) U.S. Cl.
CPC ............ *F03D 13/40* (2016.05); *Y02E 10/721* (2013.01)

(58) Field of Classification Search
CPC .............................. F03D 13/40; Y02E 10/721
USPC .................... 410/32–34, 44, 45, 53; 280/404
See application file for complete search history.

(56) References Cited

U.S. PATENT DOCUMENTS 7,704,024 B2 * 4/2010 Kootstra .................. B60P 3/40
410/44

* cited by examiner

*Primary Examiner* — Steven T Gordon
(74) *Attorney, Agent, or Firm* — Dan Brown Law Office; Daniel R. Brown

(57) ABSTRACT

A system for transporting wind turbine blades includes a root support structure for supporting a wind turbine blade root and a tip section support structure for supporting a wind turbine blade tip. Each of the root and tip support structures includes upper and lower frames, first and second side frames, a set of upper corner fittings disposed at upper corners of the support structure, and a set of lower fittings disposed at lower corners of the support structure. The sets of corner fittings allow the root and tip support structures to be coupled to vertically or horizontally adjacent root and tip support structures to form an array of support structures for transporting multiple wind turbine blades. The sets of corner fittings also allow for attachment to handling equipment, as well as to reinforcing structures for reinforcing an array of tip support structures.

14 Claims, 30 Drawing Sheets

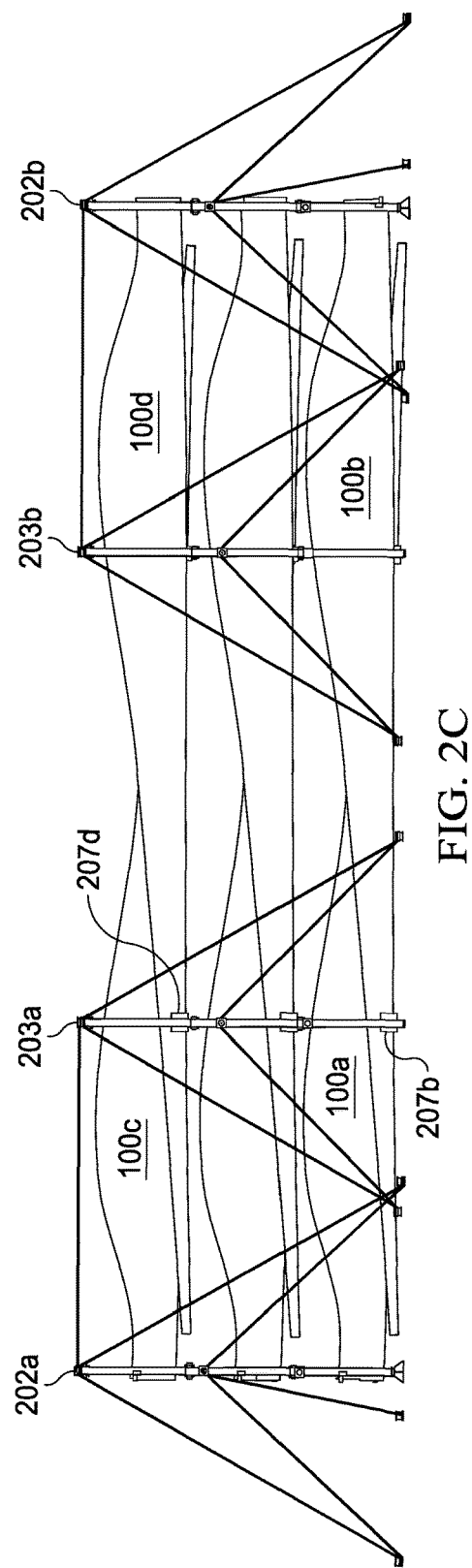

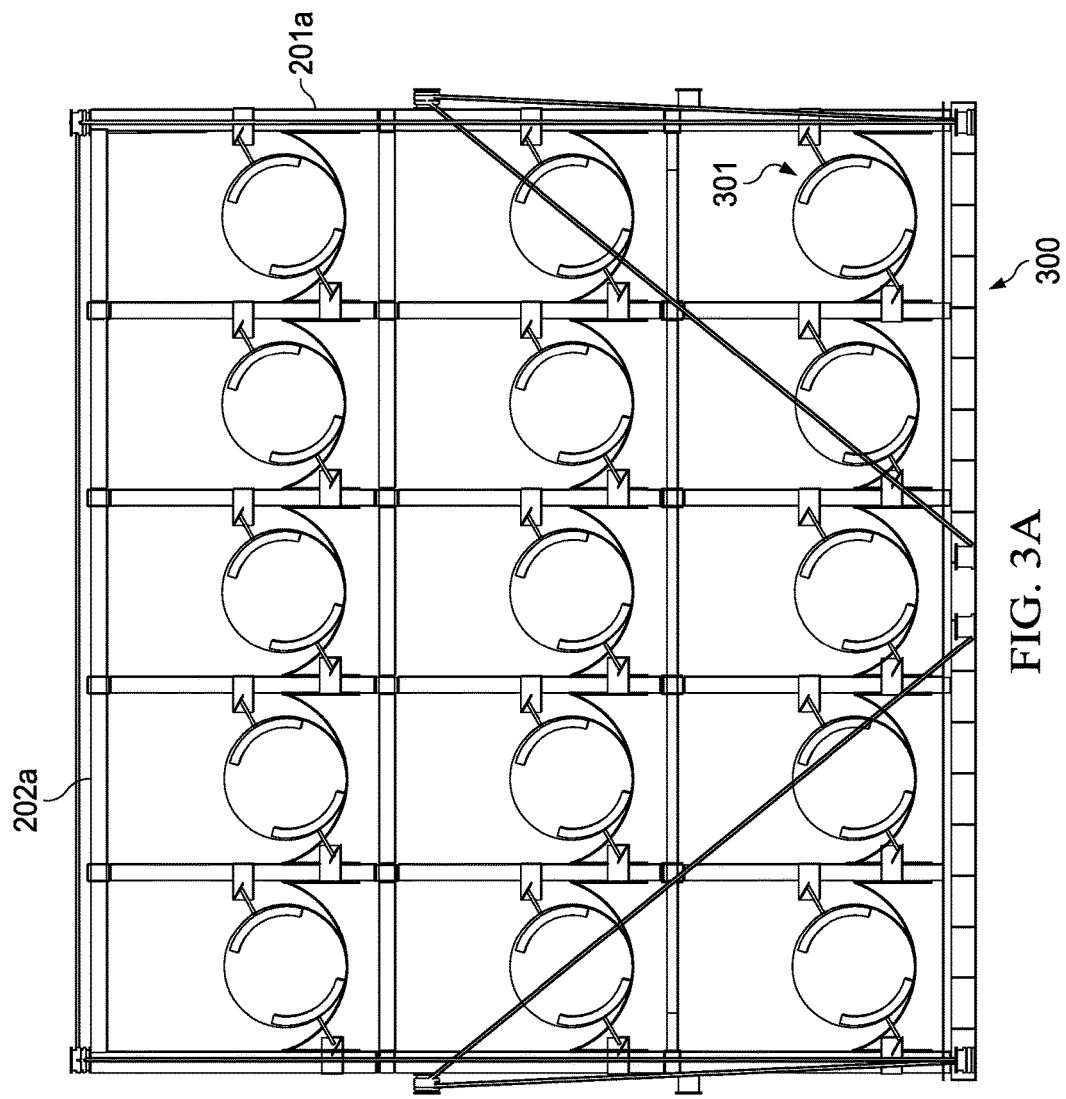

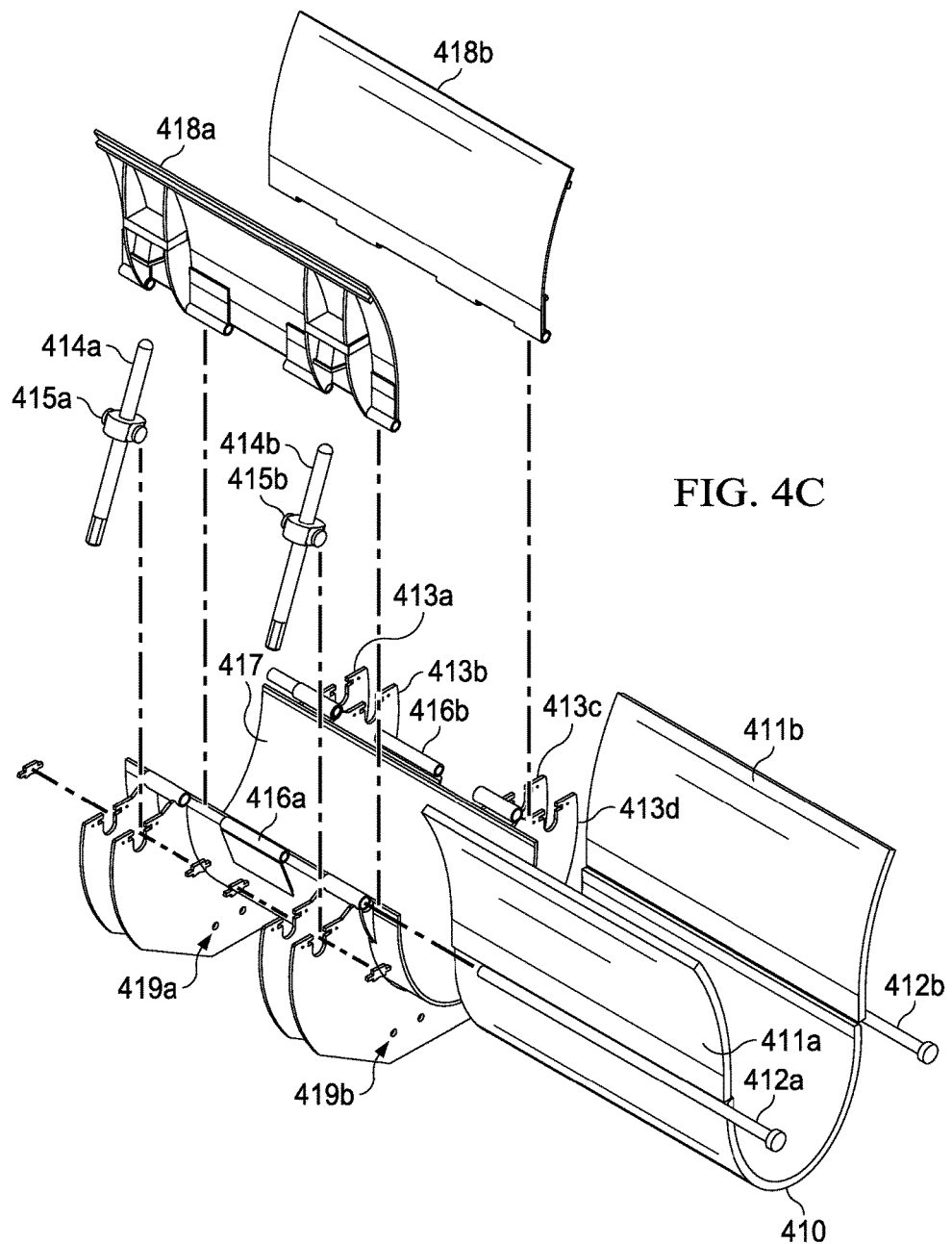

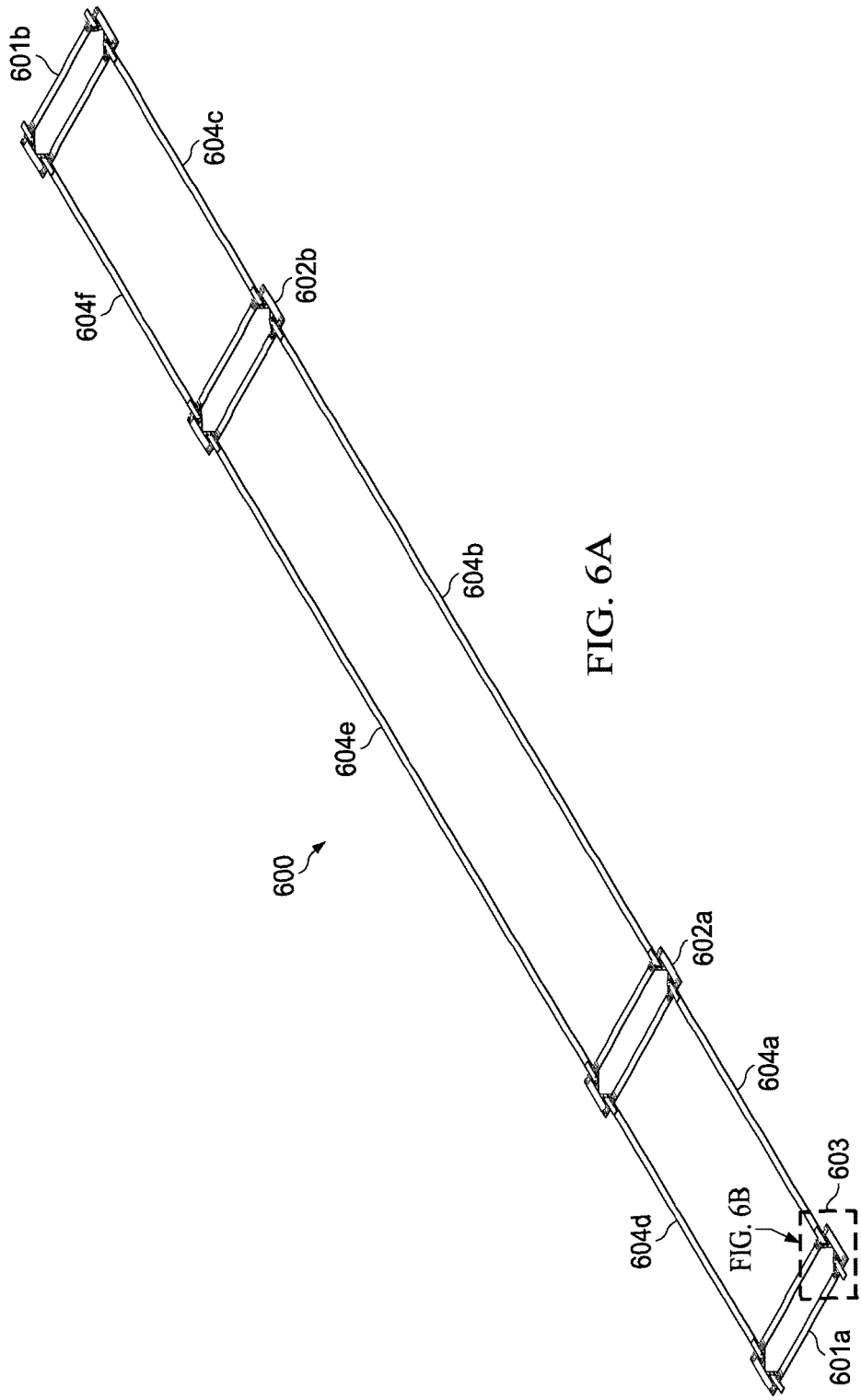

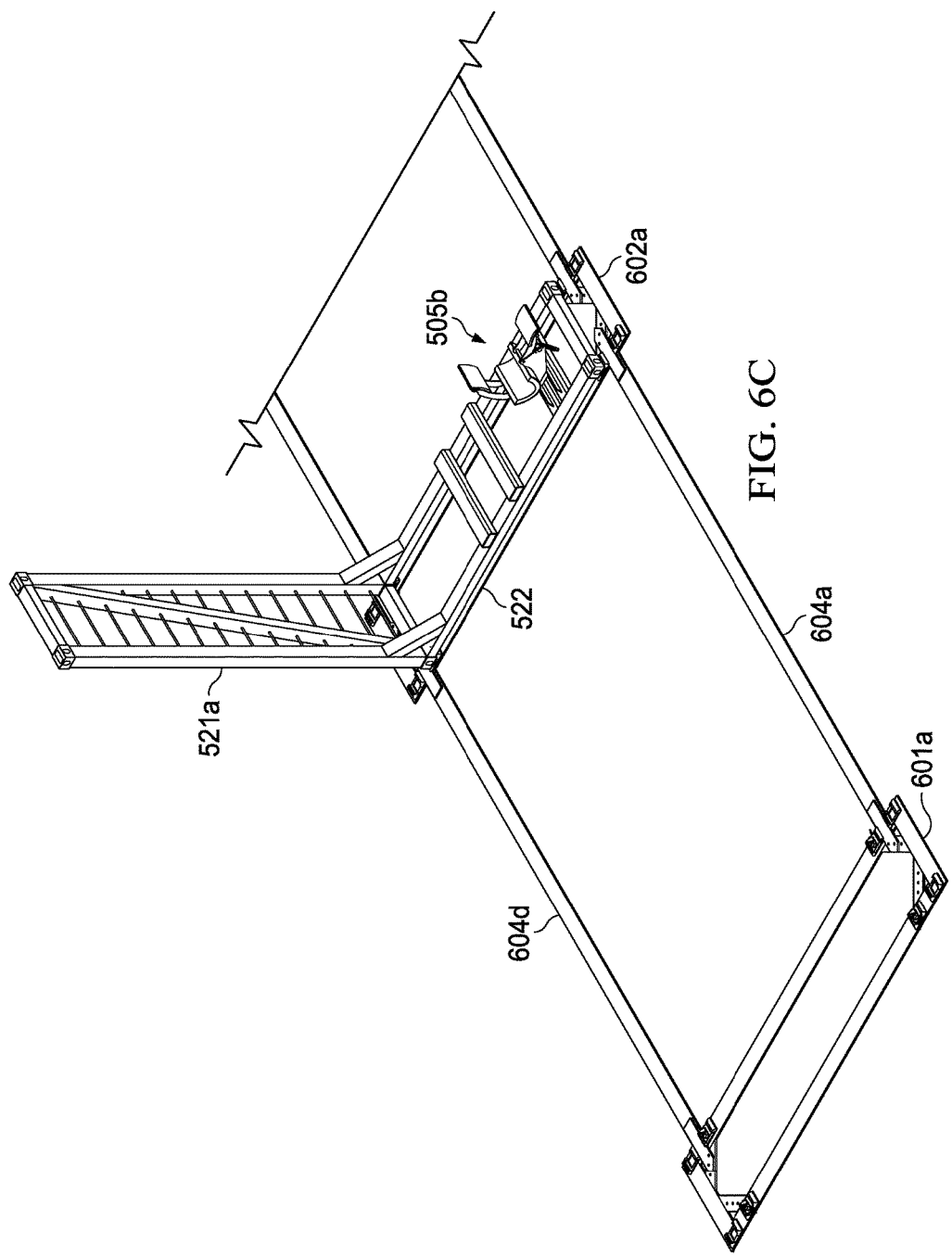

SYSTEMS AND METHODS FOR TRANSPORTING WIND TURBINE BLADES

CROSS-REFERENCE TO RELATED APPLICATIONS

The present application is a continuation-in-part of U.S. Nonprovisional patent application Ser. No. 14/595,288, filed Jan. 13, 2015, which claims the benefit of U.S. Provisional Application No. 61/928,066, filed Jan. 16, 2014, both of which are incorporated herein by reference for all purposes.

The present application also claims the benefit of U.S. Provisional Application No. 62/161,387, filed May 14, 2015, which is incorporated herein by reference for all purposes.

FIELD OF INVENTION

The present invention relates in general to wind turbine blades, and in particular to systems and methods for transporting wind turbine blades.

BACKGROUND OF INVENTION

Wind turbines have become an important source of electrical power worldwide. Generally, wind turbines are supported by a tower and driven by multiple wind turbine blades, each of which is typically tens of meters in length. As efforts are made to increase the amount of electrical power generated per wind turbine, the length of the wind turbine blades has also correspondingly increased.

The significant length of currently available wind turbine blades, as well as the continuing efforts to design and manufacture even longer wind turbine blades, has presented substantial challenges for those tasked with transporting wind turbine blades from the manufacturer to the wind turbine farms. One particular challenging scenario is the transportation by ship.

Currently, the blade manufacturer typically bolts fixtures to the blade root and tip sections, which provide points for the blades to be lifted and moved without damage, as well as for securing the blades to ship decks and other transportation vehicles. Although these fixtures are usually designed and fabricated for reuse, in actual practice their components, including the bolts, are often lost or discarded at the wind turbine farms, which can result in a significant, and often avoidable, monetary loss to the wind turbine blade manufacturer.

The lifting of wind turbine blades on and off of ships, as well the process of securing the wind turbine blades to the ship decks, present a number of other problems. Among other things, in-port time and cost constraints require techniques for quickly and safely lifting the blades on and off of the ship, as well as for efficiently and effectively securing the blades to the ship decks for safe transit overseas.

Another factor is maximizing the number of wind turbine blades that can be carried per shipload. For example, in some circumstances, the blades are stacked in an edge-horizontal orientation to increase packing density; however, depending on the size of the ship, the loading applied during transport at sea can cause the horizontally-oriented bodies of the stacked blades to flex vertically, which can result in undue stress, contact between vertically adjacent blades, and blade damage.

SUMMARY OF INVENTION

The principles of the present invention are generally embodied in a system for transporting wind turbine blades, which includes a root support structure for supporting a wind turbine blade root and tip section support structure for supporting a wind turbine blade tip section. Each of the root and tip section support structures includes upper and lower frames, first and second side frames, a set of upper corner fittings disposed at upper corners of the support structure, and a set of lower fittings disposed at lower corners of the support structure. The sets of corner fittings allow the root and tip support structures to be coupled to vertically or horizontally adjacent root and tip section support structures to form an array of support structures for transporting multiple wind turbine blades. The set of corner fittings also allow for attachment to handling equipment, as well as to reinforcing structures for reinforcing an array of tip section support structures.

The present principles are also embodied in a reinforcing tower, which reinforces vertically adjacent tip section support structures within an array of like tip support structures. The reinforcing tower, advantageously stiffens the array, as well as reduces the number of chains, ropes, or cables required for lashing the array to a ship deck or other base structure.

Furthermore, according to the present principles, a handling system is disclosed, which can be attached to the root and tip section support structures to allow a cell transporting a pair of horizontally interleaved wind turbine blades to be lifted and moved by a pair of standard cranes or stackers.

Wind turbine blade transport systems embodying the present principles realize a number of substantial advantages over the prior art. Among other things, the fixtures typically used to transport wind turbine blades are no longer required, which reduces the unnecessary expenses that are often incurred at the wind farm work sites when fixture components are lost or discarded. Moreover, by packing the wind turbine blades edge-vertical, the effects of the forces typically incurred during ocean transport are minimized.

In addition, the stability provided by these transport system allows for a significant reduction in the number of chains, cables, and/or composite fiber lines required to secure the wind turbine blades to the deck of a ship or other transportation vehicle. Furthermore, the principles of the present invention provide for the modular construction of wind turbine transport packs of different configurations, as needed to transport wind turbine blades of varying lengths, differing numbers of wind turbine blades, and/or to meet constraints such as limits on available ship deck and/or hold space. Blade transport systems embodying the inventive principles, when not in use, can be disassembled for storage and transport in standard land-sea shipping containers.

BRIEF DESCRIPTION OF DRAWINGS

For a more complete understanding of the present invention, and the advantages thereof, reference is now made to the following descriptions taken in conjunction with the accompanying drawings, in which:

FIG. 2C is a side elevational view of the loaded wind turbine blade pack shown in FIG. 2A

FIG. 3A is an elevational view of one of the two substantially similar end frames of FIG. 2A, shown without the associated wind turbine blades installed within the wind turbine blade pack;

FIG. 4C is an exploded view of the wind turbine blade tip section support structure shown in FIG. 4A;

FIG. 6A is a perspective view of a position template system suitable for assembling the wind turbine transportation cell of FIG. 5A;

FIG. 6C is a perspective view illustrating the use of the position template system of FIG. 6A with respect to a selected one of the blade tip section support frames of FIGS. 5A and 5D;

DETAILED DESCRIPTION OF THE INVENTION

The principles of the present invention and their advantages are best understood by referring to the illustrated embodiment depicted in FIGS. 1-8 of the drawings, in which like numbers designate like parts.

Figure 1A:
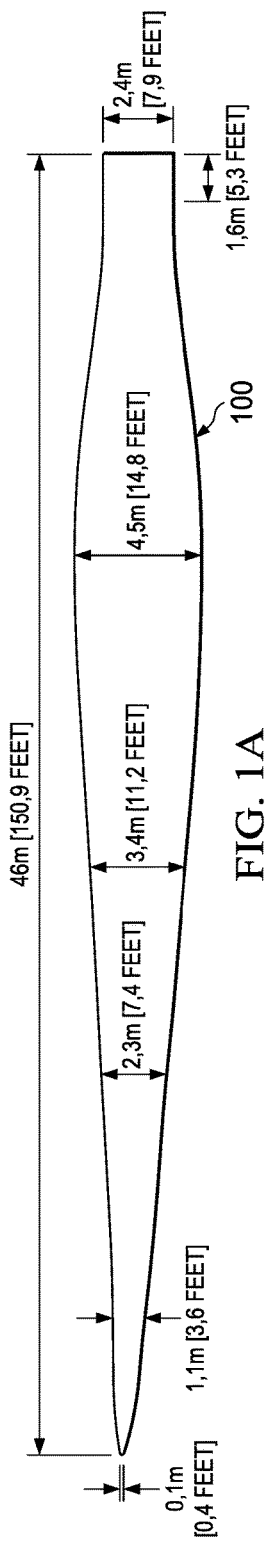
FIGS. 1A-1C are respectively top, side, and end views of a generic wind turbine blade suitable for describing the principles of the present invention (the dimensions shown provide a reference as to scale and relative proportions and may vary in actual practice)
Figure 1B:
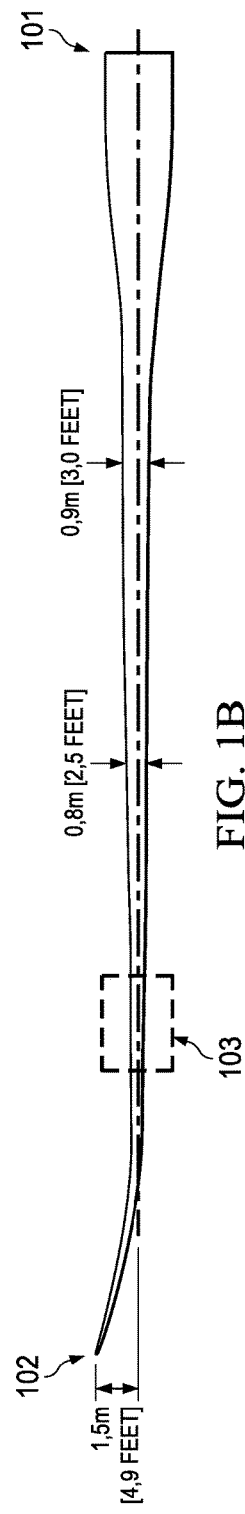
Figure 1C:
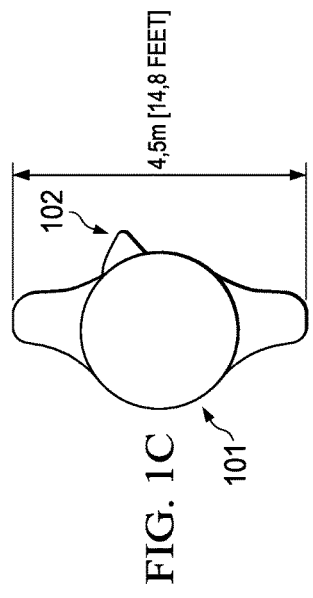

FIGS. 1A-1C are conceptual diagrams of a generic wind turbine blade 100 suitable for describing the principles of the present invention. Currently there are a number of wind turbine blade constructions used worldwide, although a typical wind turbine blade 100 will include a root with a cylindrical section 101 and skin panels or shells supported by the root, which extend to a blade tip 102 and provide the surfaces of the blade airfoil. Longitudinally extending bolts, discussed below, attach cylindrical section 101 to the rotor hub of the associated wind turbine. Each manufacture typically provides a reinforced blade tip section 103 for allowing wind turbine blade 100 to be secured, transported, and supported without damage to the outer shell or root.

Representative dimensions are shown in FIGS. 1A-1C to provide the reader with a sense of scale, although wind turbine blades of 75 meters or more are currently viable and the trend in the wind turbine industry is to use increasingly longer blades. (Generally, longer turbine blades, and increased airfoil surface area, allow for an increase in power output from the wind turbine.) Application of the principles of the present invention are generally not dependent on the particular configuration or dimensions of the wind turbine blade itself.

Figure 2A:
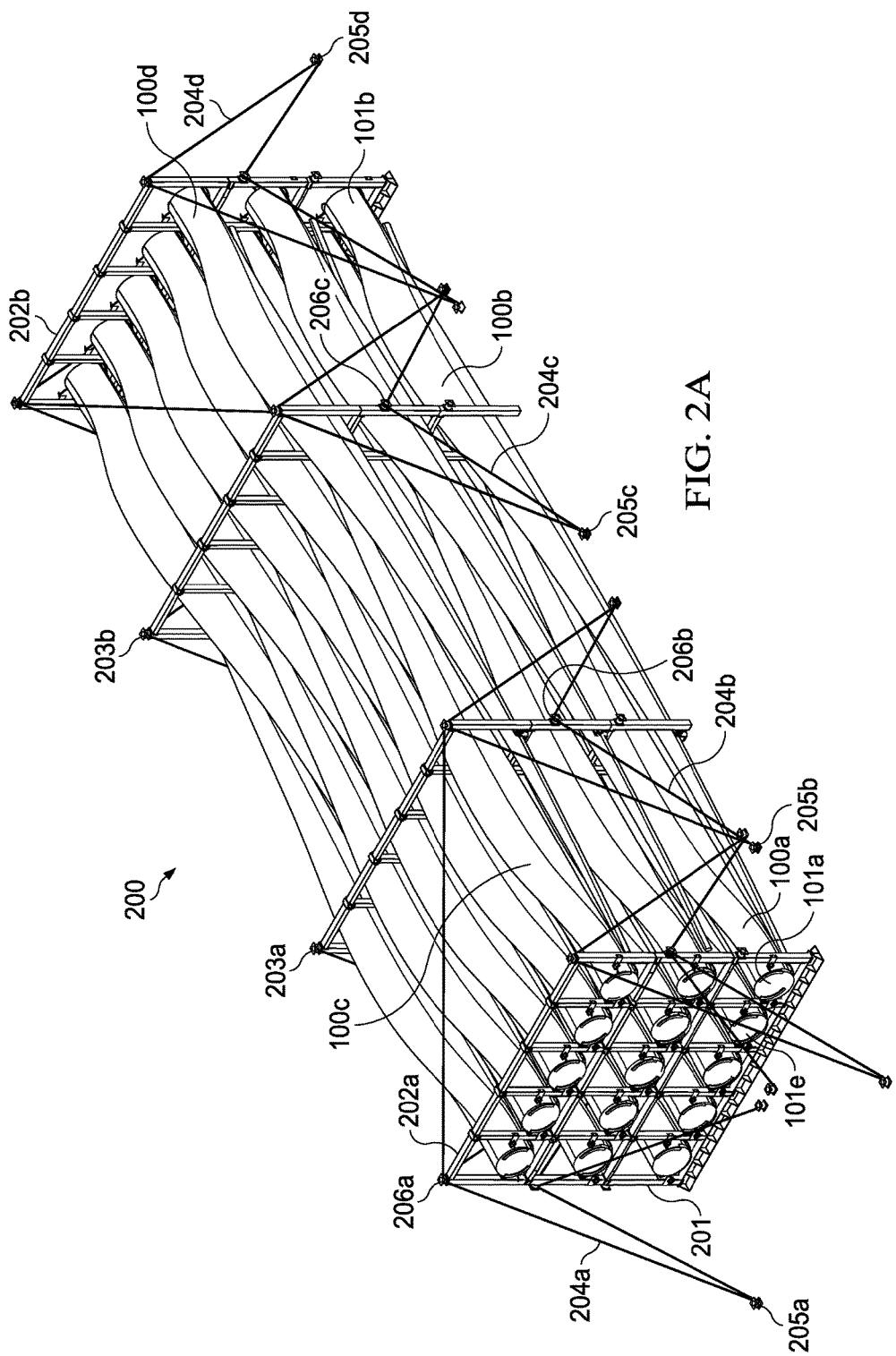
FIG. 2A is a top perspective view of a representative wind turbine blade pack embodying the principles of the present invention, as loaded with wind turbine blades similar to those shown in FIGS. 1A-1C.
Figure 2B:
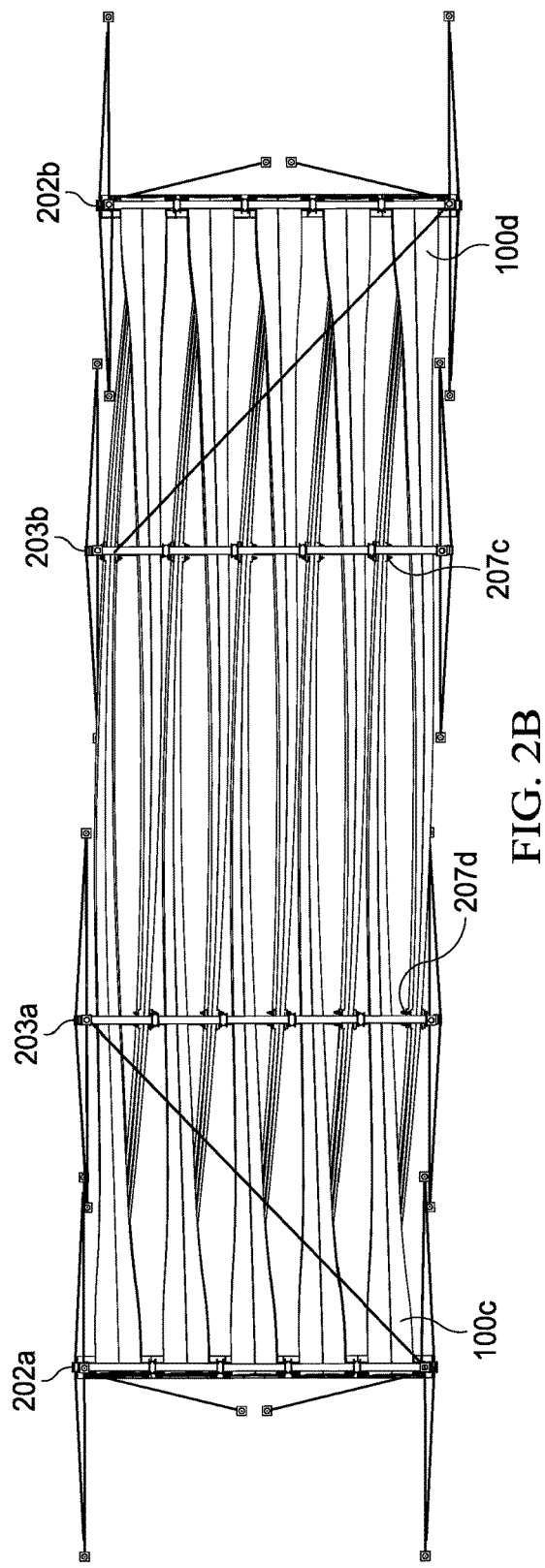
FIG. 2B is a top plan view of the loaded wind turbine blade pack shown in FIG. 2A.

FIG. 2A provides a top perspective view of a representative loaded wind turbine blade pack 200 embodying the principles of the present invention. Wind turbine blade pack 200 is most advantageously used for the securing a set of wind turbine blades during transport by ship, although other applications are possible. In the following discussion, wind turbine blade pack 200 is being used on a ship deck, which could by an upper (open) ship deck or a deck within a ship's hold. As discussed below, the modular construction of wind turbine pack 200 provides flexibility such that wind turbine pack 200 may be used in circumstances where the available deck or hold space differs.

In the illustrated embodiment, end frames 202a-202b and middle frames 203a-203b each define four (4) longitudinally aligned 5×3 arrays of rectangular subframes 201, which are shown fully loaded with thirty (30) wind turbine blades 100. Each set of four longitudinally subframes 201 supports and secures a pair of wind turbine blades, which are disposed root-to-tip with the airfoil edges extending vertically within the subframes 201, as shown in detail in FIG. 2B. Advantageously, edge-vertical packing according to the principles of the present invention provides increased blade support in light of the forces applied during typical ship borne transit, minimizes blade flexing, and reduces the probability of cracked or damaged blade shells.

While FIG. 2A shows a configuration of wind turbine pack 200 comprising four 5×3 aligned arrays of subframes 201, the modular construction of wind turbine pack 200 generally allows end frames 202a-202b and middle frames 203a-203b to define arrays of subframes 201 having m number of horizontal rows and n number of vertical columns for securing up to m×n×2 number of wind turbine blades 100. For example, in the smallest configuration, end frames 202a-202b and middle frames 203a-203b define four single longitudinally aligned subframes 201 for transporting and securing one or two wind turbine blades 100. Similarly, 2×2 aligned arrays of subframes 201 will accommodate up to eight (8) wind turbine blades, 5×1 aligned arrays of subframes 201 will accommodate up to ten (10) wind turbine blades, and so on. Advantageously, wind turbine pack 200 can be customized depending on the number of wind turbine blades being transported, any limitations on ship deck or hold space, and similar factors.

Wind turbine blade pack 200 is secured and stabilized by a series of conventional maritime fasteners 204, such as chains, cables, or composite fiber lines, which extend from fastening points 205 on the ship deck to fastening points 206 on end frames 202a-202b and middle frames 203a-203b. While four exemplary fasteners 204a-204d, along with the associated fastening points 205a-205d and 206a-206d are indicated for reference, in actual practice the number of fastening devices 204 used may vary significantly, as necessary to secure the loaded wind turbine blade pack 200 to the ship deck. In a typical application 100 or more fasteners may be required to secure a loaded turbine blade pack 200 the ship deck; however, because wind turbine blade pack 200 provides significant support and stability to wind turbine blades 100, the number of fasteners 204 required may be substantially reduced in view of existing methods of securing wind turbine blades to ship decks, which typically may require 300 or more similar fasteners. In addition, by providing fixed attachment fastening points 205 on wind turbine pack 200, interference between the wind turbine blades 100 and fasteners 204 is minimized.

Figure 2D:
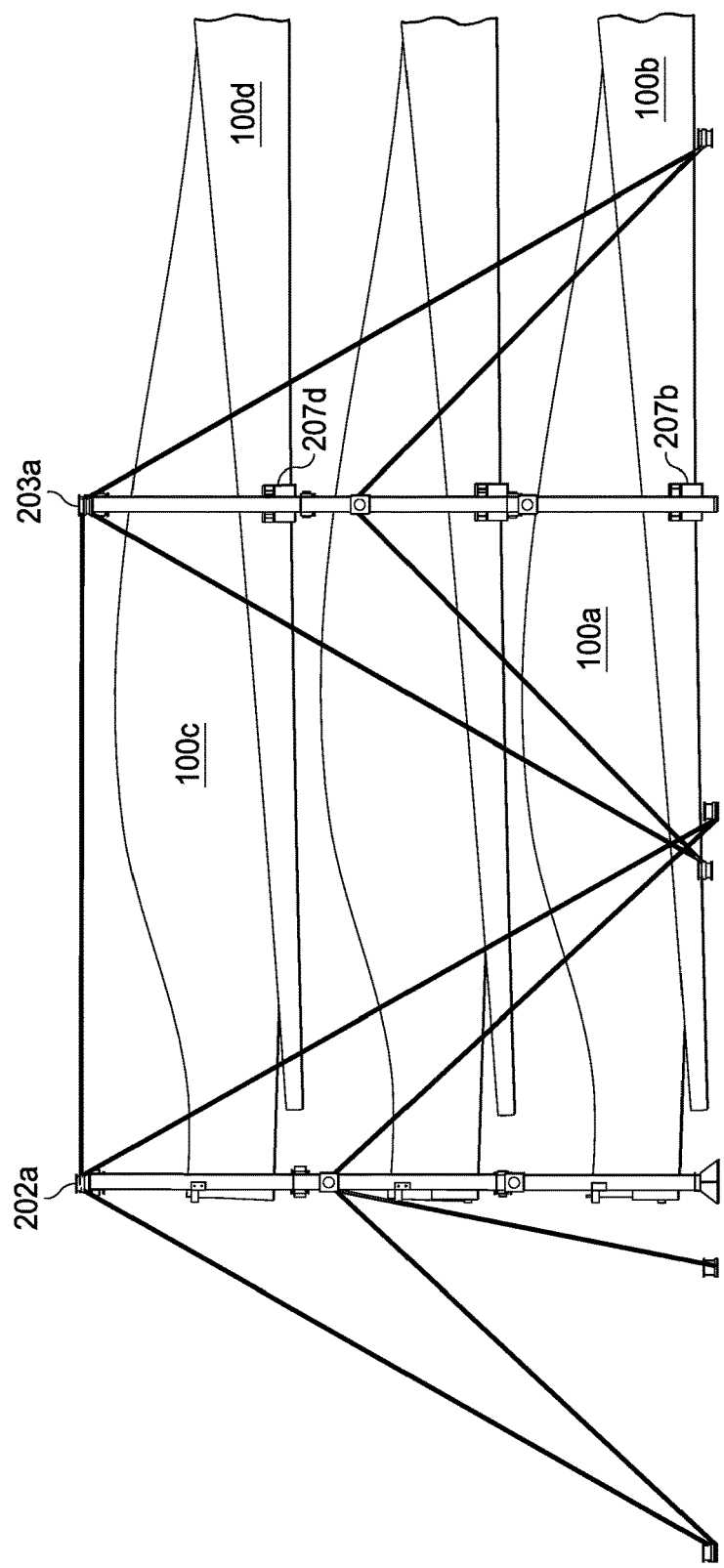
FIG. 2D is a partial side elevational view showing in further detail the root-to-tip interleaving of adjacent wind turbine blades loaded into the wind turbine blade pack of FIG. 2A.

FIG. 2C is a side elevational view showing the packing of wind turbine blades 100 in wind turbine blade pack 200. FIG. 2D shows one end of packed wind turbine blade pack 200 in further detail. The reinforced tip section 103 of each blade 100 is supported by a blade tip support assembly ("taco") 207 and the corresponding cylindrical root section 101 is supported by a blade root support assembly ("saddle") 301, discussed below in conjunction with FIGS. 3A-3D. For example, blade tip support assembly 207b supports the reinforced tip section 103 of wind turbine blade 100b, blade tip support assembly 207c and blade tip support assembly 207d supports the reinforced tip section 103 of wind turbine blade 100d. The spacing of end frame sections 202a-202b and middle frame sections 203a-203b will therefore depend on the length of the wind turbine blades 100 being secured, as well as the location of reinforced blade sections 103. Advantageously, the modular construction of wind turbine blade pack 200 allows the spacing between end frames 202a-202b and middle frames 203a-203b to be set to accommodate wind turbine blades of different lengths and with reinforced sections in different locations.

Blade tip support assemblies 207 are discussed in further detail below in conjunction with FIGS. 4A-4E. However, generally, each blade tip support assembly 207 includes a U-shaped receptacle for receiving the blade edge in reinforced tip section 103 of the corresponding wind turbine blade 100. A pair of opposing flaps contract onto the opposing blade outer surfaces to secure and stabilize the wind turbine blade tip section.

Figure 2E:
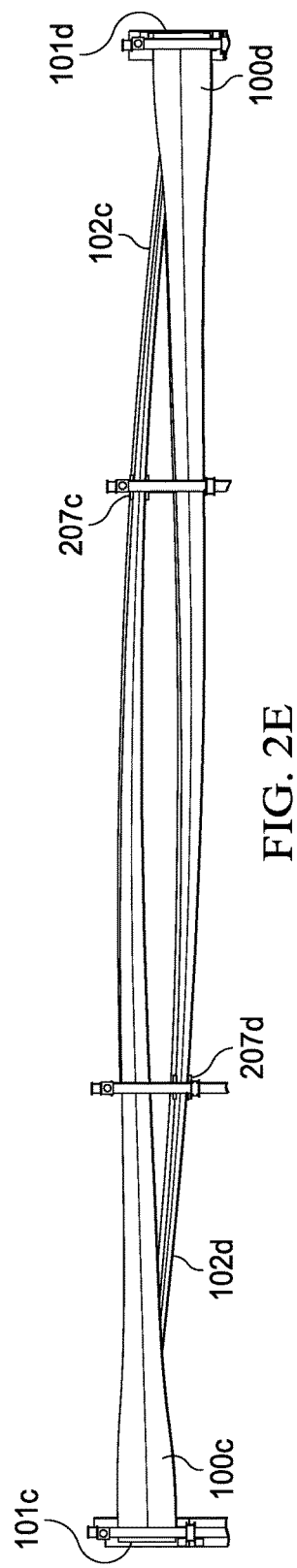
FIG. 2E is a top plan view illustrating the root-to-tip interleaving of a representative pair of horizontally adjacent wind turbine blades loaded into the wind turbine blade pack of FIG. 2A.

The interleaving (packing) of a representative pair of wind turbine blades 100, in this example wind turbine blades 100c and 100d, within wind turbine blade pack 200 is shown in further detail in the top plan view of FIG. 2E. The blade root support assembly (saddle) 301 elevates the cylindrical root section 101 of each pair of horizontally interleaved pair of wind turbine blades with respect to the tip 102 of the opposing blade of the pair. Hence, the curved tip section 102 (see FIG. 1B) of one blade curls underneath the cylindrical root section 101 of the other. The curling of the tip of one blade under the cylindrical root section of the other, in addition to the edge-vertical orientation, helps reduce the horizontal distance required to pack each pair of blades.

FIG. 3A is an end elevation view of end frame 202a, which is shown without installed wind turbine blades 100 for clarity. The configuration of opposing end frame 202b is similar.

Each end frame 202 is supported on the ship deck by a bottom beam 300, which is preferably fabricated from steel. In one embodiment, each bottom beam 300 is received within a shoe on the ship deck (not shown), although bottom beams 300 may also be fastened to the ship deck by welding, bolts, brazing, or other similar conventional techniques. Preferably, bottom beams 300 of end frames 202 are wider than the bottom beams of middle frames 203, discussed below. Each subframe 201 of each end frame 202 includes a blade root support assembly 301 ("saddle"), which supports and stabilizes the cylindrical root section 101 of a corresponding wind turbine blade 100.

Figure 3B:
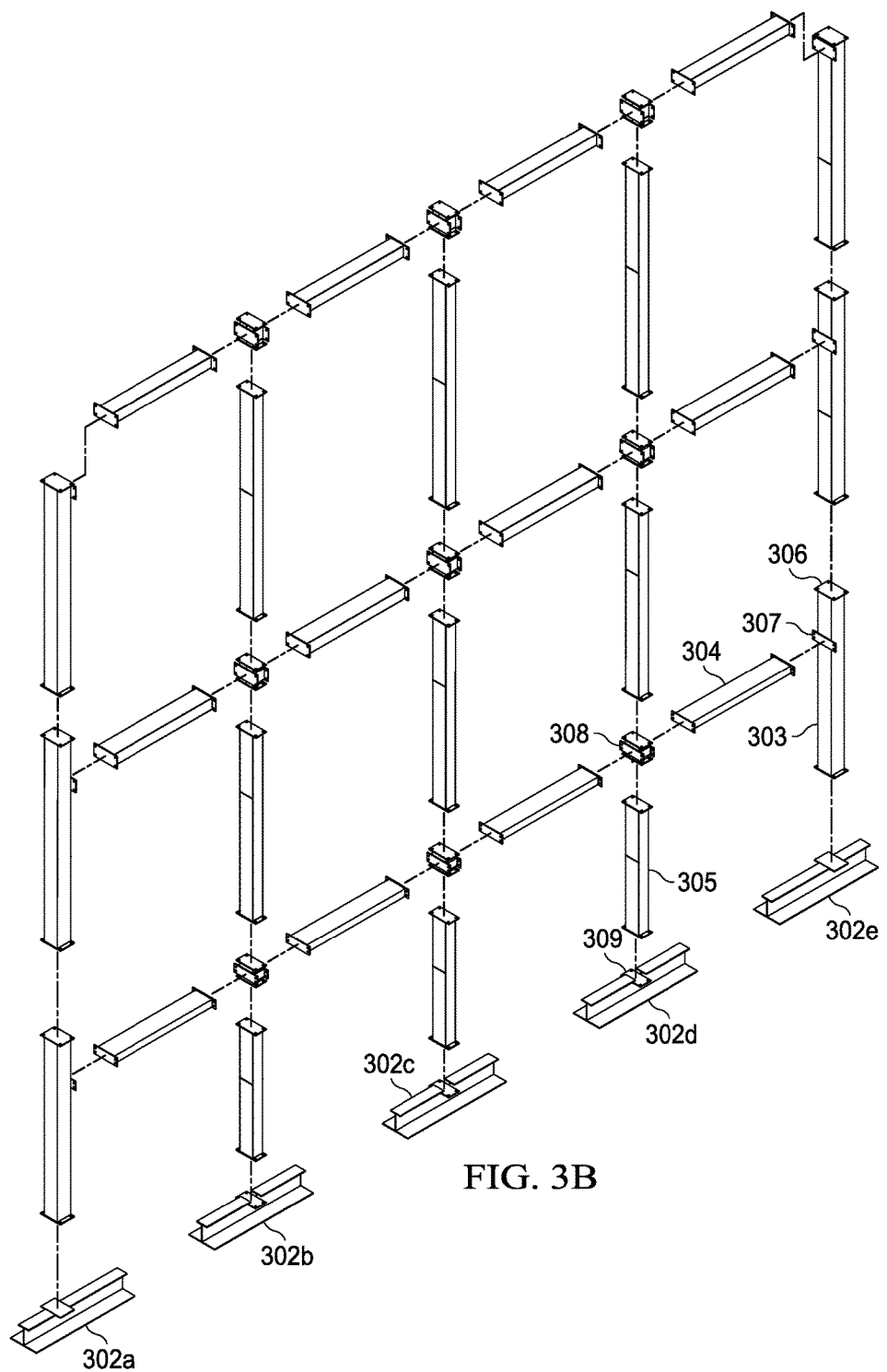
FIG. 3B is an exploded view of the end frames shown in FIG. 3A.

An exploded view of one end frame 202 is shown in FIG. 3B. The array of subframes 201 of each end frame 202 is constructed from a set of outer vertical beams 303, horizontal beams 304, and interior vertical beams 305. Vertical beams 303 and 305 and horizontal beams 303 are preferably fabricated from steel.

Outer vertical beams 303 form columns defining the lateral edges of the given end frame 202. Interior vertical beams 305 are shared by horizontally adjacent subframes 201. Horizontal beams define the top and bottom vertically adjacent subframes 201.

Outer vertical beams of vertically adjacent subframes 201 bolt together at plates 306 and with the associated horizontal beams 304 at plates 307. Interior vertical beams 305 of vertically adjacent subframes 201 are bolted together, along with the adjacent horizontal beams 304, at steel crosses 308.

Preferably, bottom beam 300 of each end frame 202 is formed from multiple steel sections 302a-302e, which are fastened together using conventional techniques such as welding or brazing. Outer vertical steel beams 303 and interior vertical steel beams 305 are preferably bolted to plates 309 disposed on slots in bottom beam 300.

In the preferred embodiment of end frames 202, the various structures forming the assembly (e.g., outer vertical beams 303, horizontal beams 304, and inner vertical beams 305) are fastened together with bolts or similar removal fastening devices, which advantageously allows end frames 202 to be quickly assembled and disassembled for use, movement, and storage. In alternate embodiments, end frames 202 may also be assembled using other techniques such as welding, brazing, or the like.

Figure 3C:
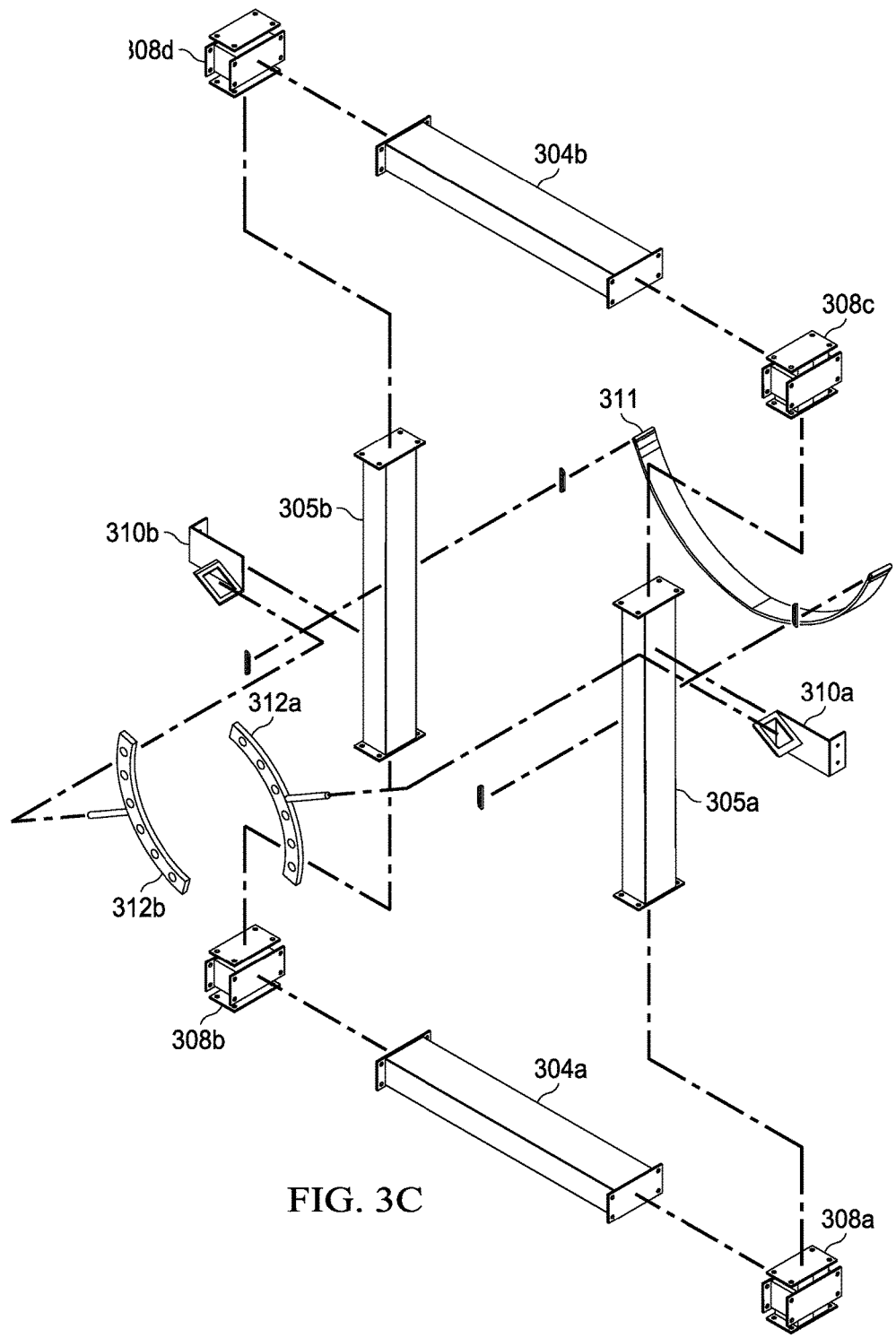
FIG. 3C is an exploded view of one of the wind turbine blade root support assemblies shown in FIG. 3A.

An exemplary blade root support assembly (saddle) 301 is shown in further detail in the exploded view of FIG. 3C. Blade root support assemblies 301 in the array of subframes 201 of each end frame 202a-202b are similar.

In this example, blade root support assembly 301 is supported by a pair of interior vertical steel beams 305a and 305b and a pair of horizontal steel beams 304a and 304b, discussed above in conjunction with FIG. 3B. A pair of opposing strap support assemblies 310a-310b support and adjust the length of a conventional flexible strap 311. When wind turbine blade pack 200 is loaded, strap 311 lies underneath and supports the cylindrical root section 101 of the associated wind turbine blade 100.

Figure 3D:
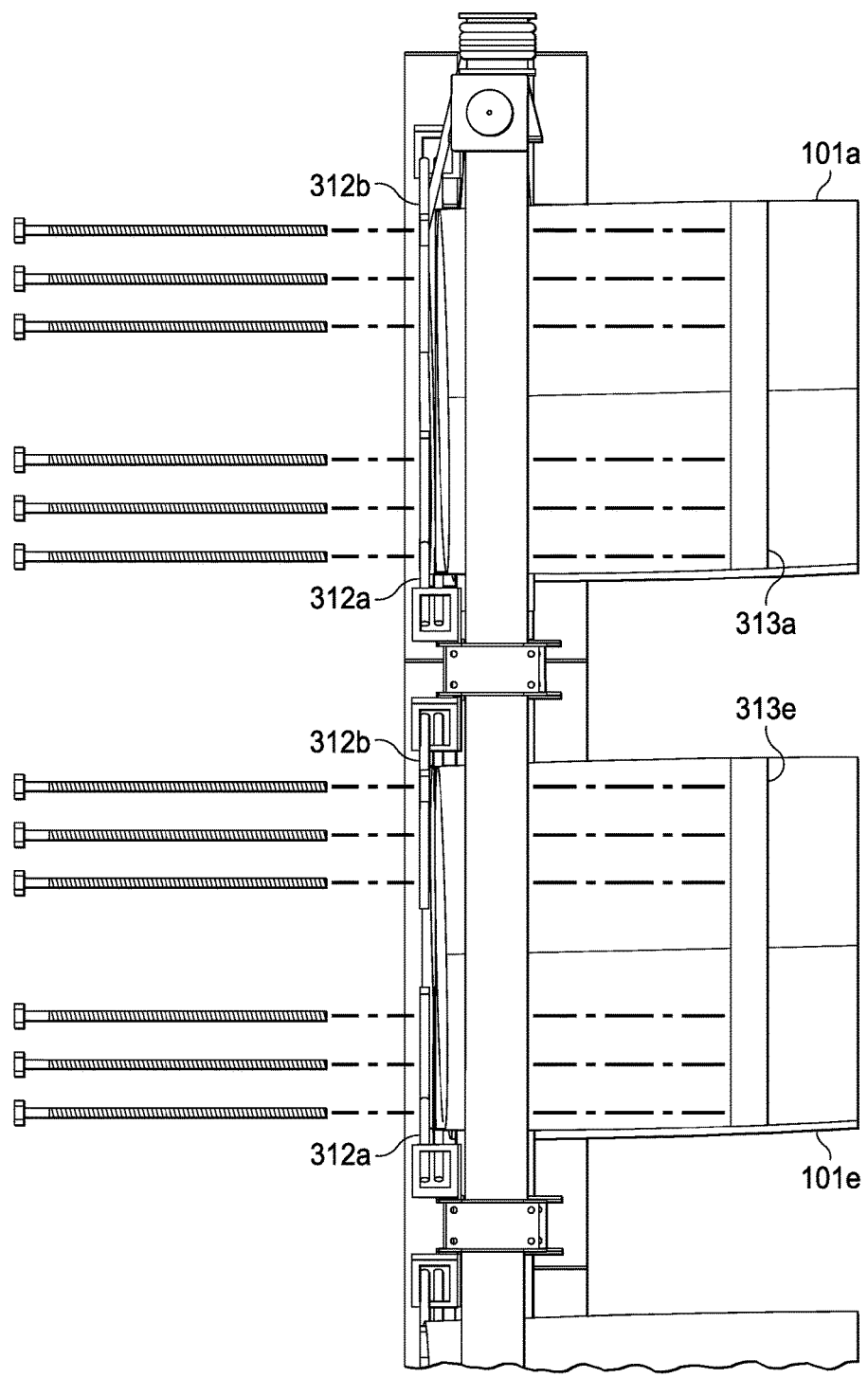
FIG. 3D is a top plan view showing in detail the cylindrical ends of a pair of horizontally adjacent wind turbine blades supported by corresponding blade root support assemblies, as shown in FIG. 3C, and the corresponding end frame shown in FIG. 3A.

Ears 212a-212b include apertures for receiving bolts that thread into the end of the cylindrical root section 101 of the associated wind turbine blade, as shown in FIG. 3D. (These bolts also fasten the wind turbine blade to the hub of the wind turbine, as known in the art).

FIG. 3D is a top plan view showing exemplary cylindrical root sections 101a and 101e of a pair of exemplary horizontally adjacent wind turbine blades 101a and 101e within loaded wind turbine blade pack 200 of FIG. 2A (see FIG. 1A). As shown in FIG. 3D, a second flexible strap 313 extends around the periphery of each cylindrical root section 101 and attaches to either end frame bottom beam 300, in the case of the lowest row in the array of subframes 201, or horizontal steel beam 304 disposed immediately below, in the case of rows in the array of subframes 201 above the bottom row. In the example of FIG. 3D, straps 313a and 313e respectively secure and stabilize the cylindrical root sections 101a and 101e of wind turbine blades 101a and 101e of FIG. 2A.

Figure 4A:
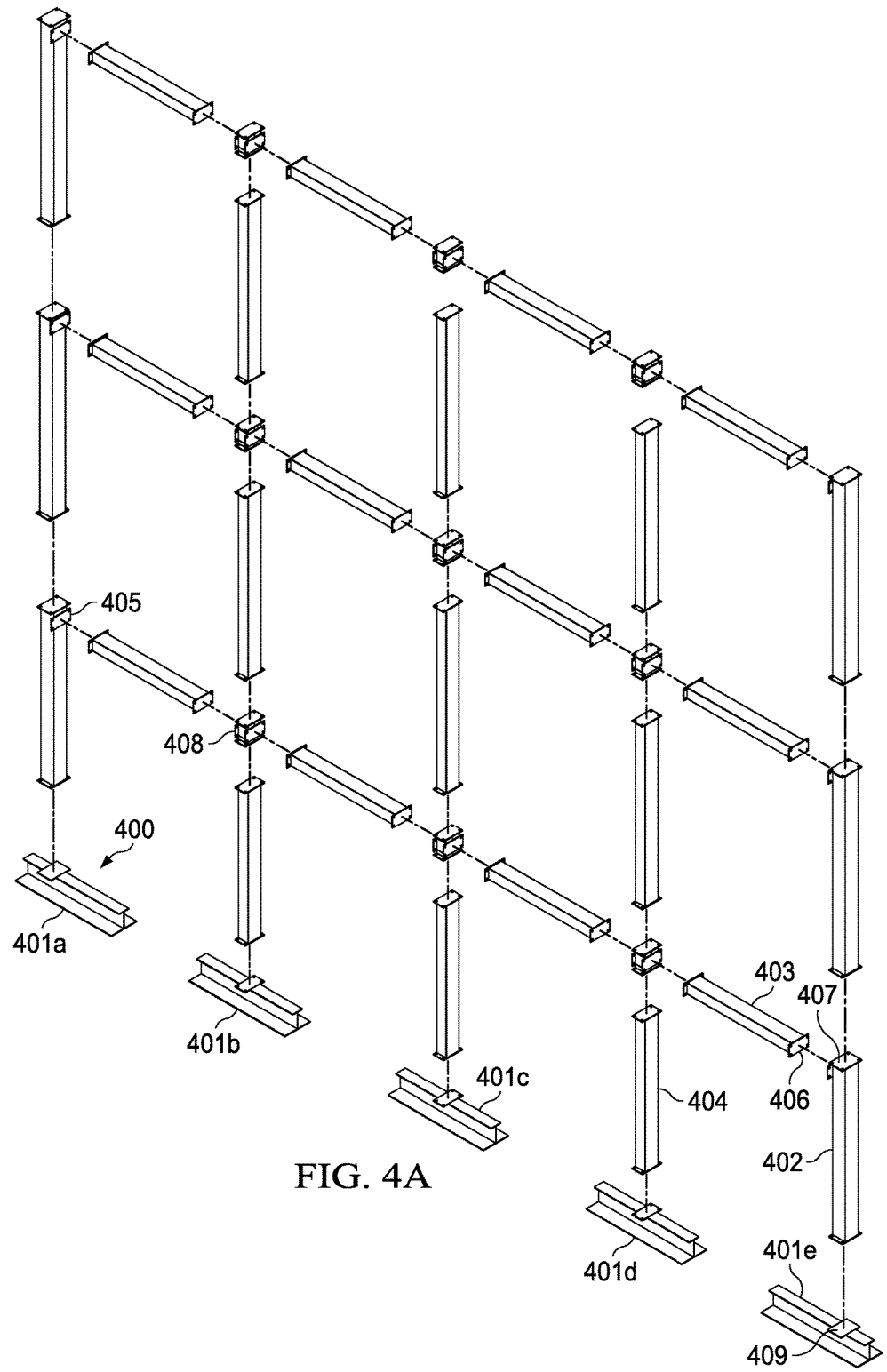
FIG. 4A is an exploded view of one of the two substantially similar middle frames shown in FIG. 2A.

An exploded view of one of the middle frames 203a-203b is provided in FIG. 4A. Each middle frame 203 includes a bottom beam 400, which preferably is formed from steel beam sections 401a-401e, which are fastened together, as well as to the ship deck, using conventional methods such as welding, brazing, or bolting.

Middle frames 203, in the illustrated embodiment, include outer vertical beams 402, horizontal beams 403, and interior vertical beams 404. Preferably, outer vertical beams 402, horizontal beams 403, and interior vertical beams 404 are fabricated from steel.

Outer vertical steel beams 402 bolt together at plates 407 to form columns defining the lateral edges of the given middle frame 203a-203b. Horizontal steel beams 403 define the top and bottom of each subframe 201 in the array of subframes 201 defined by the middle frame 203.

Plates 406 on horizontal beams 403 bolt to plates 405 on outer vertical beams 402. Interior vertical beams 404 and horizontal beams 403 bolt together through steel crosses 408 to form the array of subframes 201. Plates 409 allow outer vertical beams 402 and interior vertical beams 404 to be bolted to beam sections 401a-401e of bottom beam 400.

As with end frames 202, in the preferred embodiment of wind turbine blade pack 200, the various structures forming the assemblies of middle frames (e.g., outer vertical beams 402, horizontal beams 403, and interior vertical beams 404) are fastened together with bolts or similar removal fastening devices, which advantageously allows middle frames 203 to be quickly assembled and disassembled for use, movement, and storage. In alternate embodiments, middle frames 203 may also be assembled using other techniques such as welding, brazing, or the like.

Figure 4B:
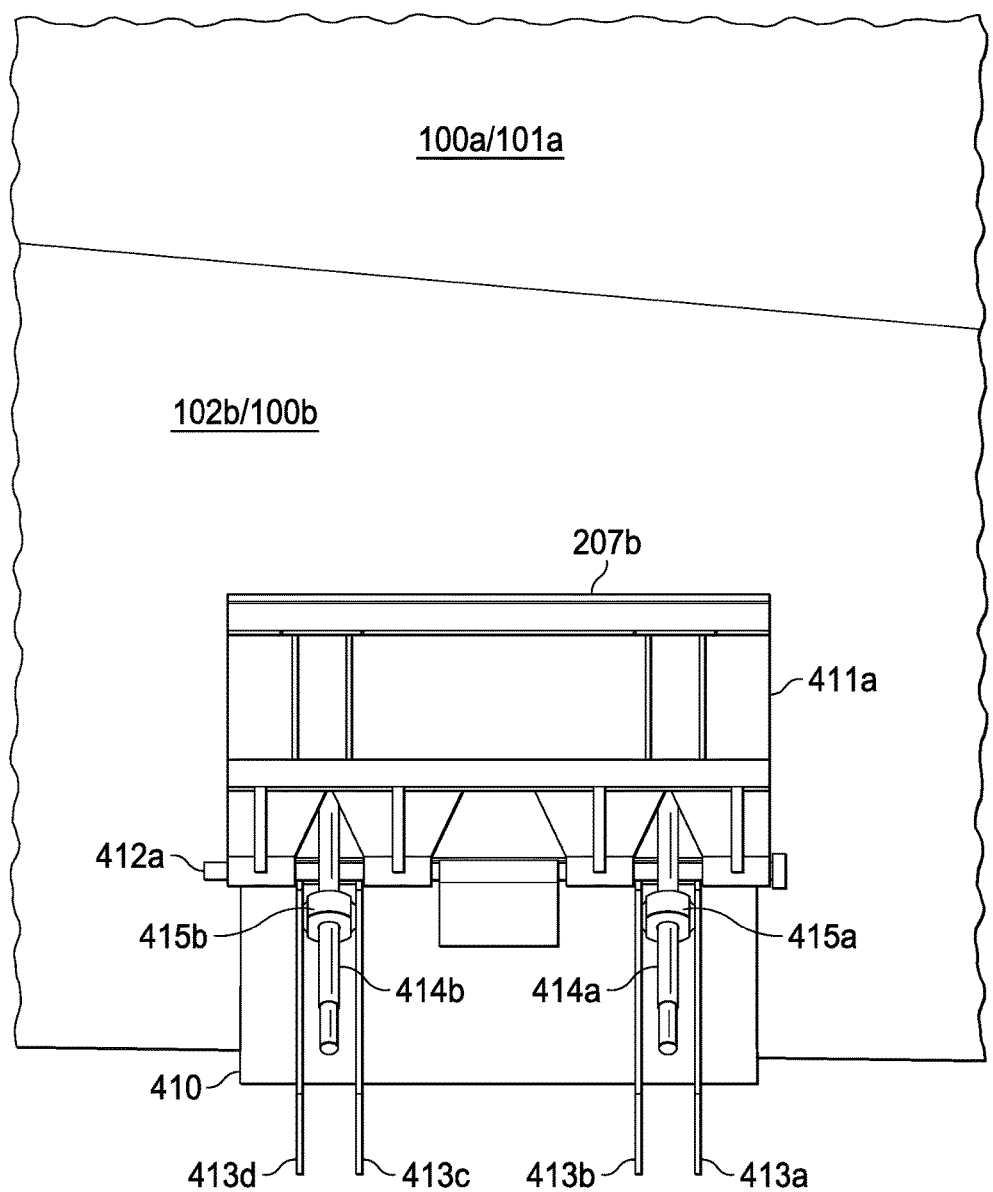
FIG. 4B is a side plan view showing one of the substantially similar wind turbine blade tip section support structures of FIGS. 2C and 2D in further detail, as supporting a corresponding wind turbine blade tip section.

FIG. 4B is a side elevational view of one of two symmetrical sides of a representative blade tip support assembly 207, in this example, blade tip support assembly 207b supporting and stabilizing the reinforced tip section 103 of wind turbine blade 100b (see FIG. 2D). A corresponding exploded view is shown in FIG. 4C.

Each blade tip support assembly 207 includes a steel U-shaped receptacle 410, which is adapted to receive the edge of the reinforced tip section 103 of the corresponding wind turbine blade 100. U-shaped receptacle 410 is supported by steel U-shaped ribs 413a-413d and a steel U-shaped liner 417.

A pair of opposing flaps 411a-411b extend from the upper edges of U-shaped receptacle 410 and are supported by support structures 418a-418b. Flaps 411a-411b and support structures 418a-418b rotate around a corresponding pair of hinges formed by shafts 412a-412b, tubes 416a-416b, and tubes 420a-420b. In particular, shafts 412a-412b rotate within tubes 416a-416b, which are disposed along the upper edges of an U-shaped liner 417 and U-shaped ribs 413a-413d. Tubes 420a-420b are fastened to the lower edges of flap support structures 418a-418b and rotate along with shafts 412a-412b.

Flaps 411a-411b pivot in response to torque applied to threaded screws 414a-414d. In the illustrated embodiment, flap 411a pivots in response to torque applied to threaded screws 414a and 414b, which respectively move through the threaded bores of nuts 415a and 415b supported by slots formed in the ends of U-shaped ribs 413a-413d (see FIGS. 4B and 4C). Similarly, flap 411b pivots in response to torque applied to threaded screws 414c and 414d, which respectively move through the threaded bores of nuts 415c and 415d supported by slots formed in the opposite ends of U-shaped ribs 413a-413d).

Bolt holes 419 though the lower portions of ribs 413a-413d allow blade tip support assembly 207 to be bolted to the underlying horizontal steep beam 403 of the corresponding subframe 201.

Figure 4D:
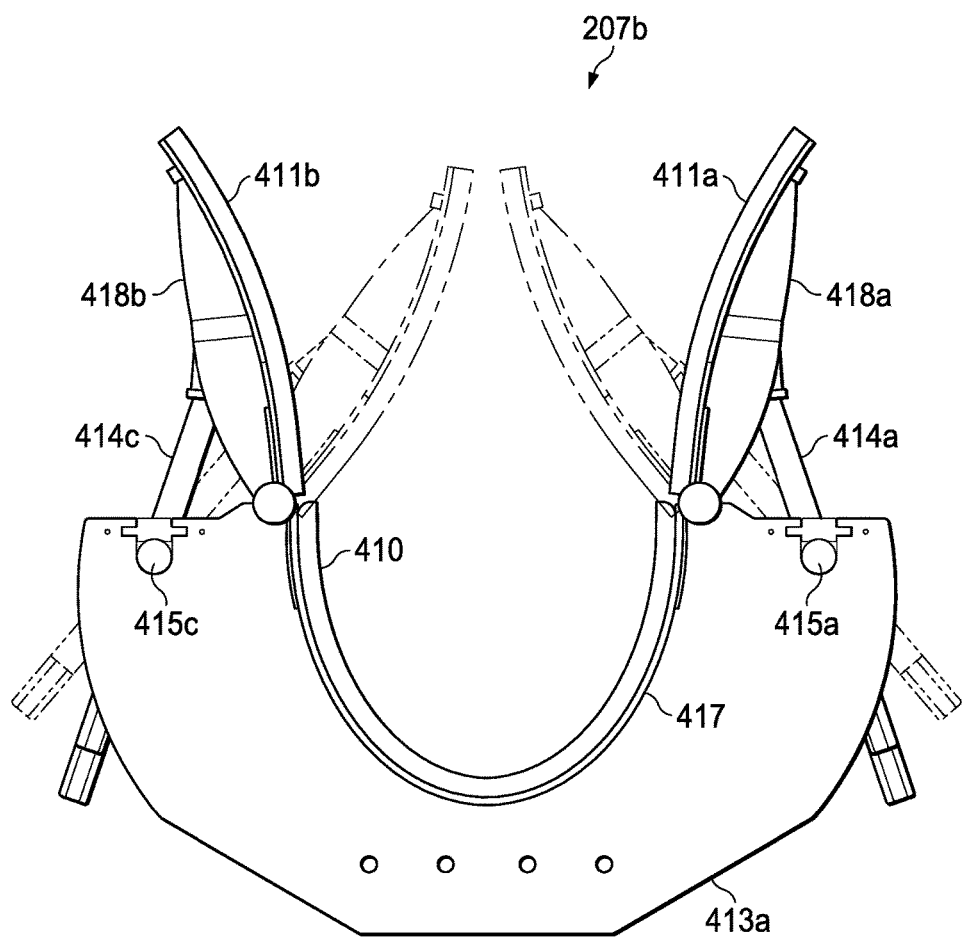
FIG. 4D is an end plan view of one end the wind turbine blade tip section support structure shown in FIG. 4A in an open state.

FIG. 4D is a end plan view of representative blade tip support assembly 207a in the open position, which allows edge of the associated reinforced turbine blade tip section 103 to be inserted and removed from U-shaped receptacle 410. In the open position, flaps 411a and 411b have been retracted using threaded screws 414a-414b.

Figure 4E:
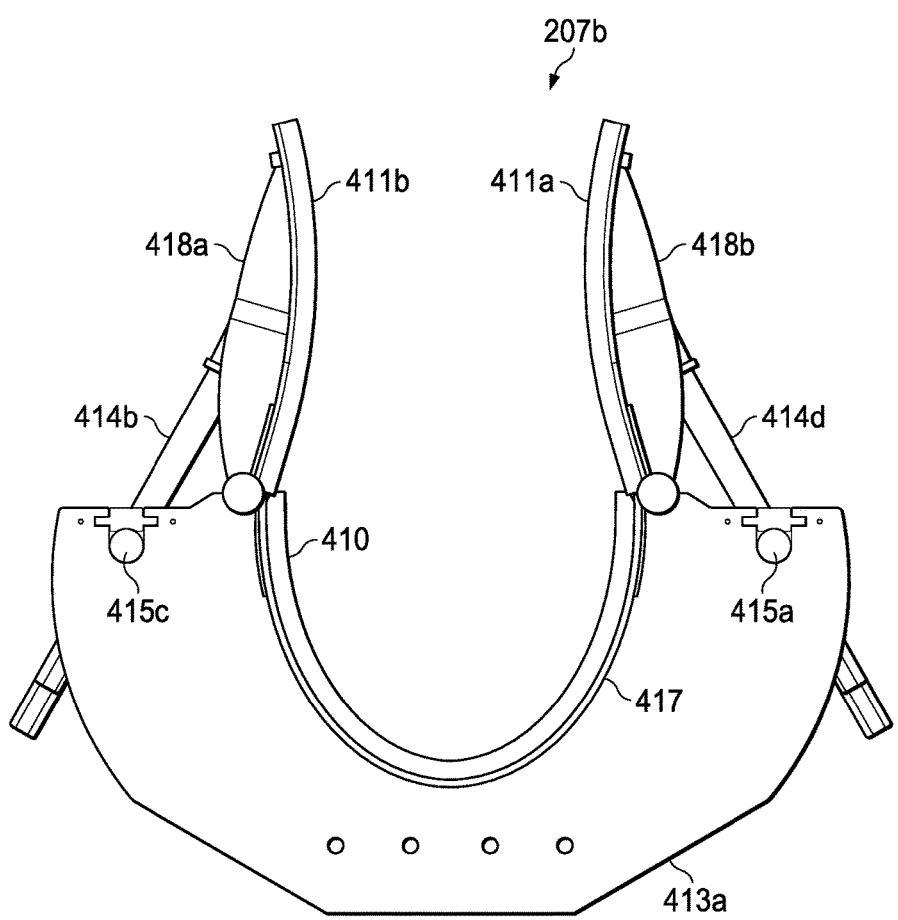
FIG. 4E is an end plan view of the opposing end of the wind turbine blade tip section support structure shown in FIG. 4A, in a closed state.

FIG. 4E is a end plan view of the opposing end of representative blade tip support assembly 207a in the closed position, which allows flaps 411a-411b to contact corresponding surfaces of the corresponding reinforced turbine blade tip section 103 and retain and stabilize that reinforced turbine blade tip section 103 within U-shaped receptacle 410. (The wind turbine blade tip section 103 is not shown in FIG. 4E for clarity.) In the closed position, flaps 411a and 411b have contracted towards the surfaces of the wind turbine blade using threaded screws 414a-414b.

In use, wind turbine blade pack 200 is assembled as it is being loaded with wind turbine blades 100. Generally, the bottom steel beams 300 of end frames 202a-202b and (FIG. 3A). The vertical beams 303 and 305 for the lowest row of the array subframes 201 are fastened to bottom steel beams 300 of each end frame 202a-202b (FIG. 3B). The blade root support assemblies 301 are fastened to vertical beams 303 and 305 for each subframe 201 in the row (FIG. 3C).

Similarly, the lower steel beams 400 of middle frames 203a-203b are fastened to the ship deck and vertical steel beams 402 and 404 for the lowest row of the array of subframes 201 are fastened to bottom steel beams 400 (FIGURES. Blade tip support assemblies 207 are fastened to bottom steel beams 400 of middle frames 203a-203b for the lowest row.

The wind turbine blades 100 are then loaded into the lowest row in the arrays of subframes 201. The cylindrical root section 101 of each blade is lowered onto strap 311 of the corresponding root support assembly 301 while the reinforced blade tip section 103 is lowered into U-shaped receptacle 410 of the corresponding blade tip support assembly 207. The cylindrical root section 101 of each blade is bolted into the corresponding blade root support assembly 301 through ears 312 (FIG. 3D). Straps 313 are disposed around the periphery of each cylindrical root section 100 and fastened to the bottom steel beam 300 of the corresponding end frame 202 (FIG. 3D). Flaps 411a-411b for each blade tip support assembly 207 are then retracted into contact with the surfaces of the corresponding reinforced blade tip section 104 (FIG. 4E). After the lowest row in the arrays of subframes 201 are loaded and the wind turbine blades secured, the horizontal beams 303 of end frames of 202a-202b (FIG. 3B) and the horizontal beams 403 of middle frames 203a-203b (FIG. 4A) are fastened into place.

This process of assembling and loading wind turbine blade pack 200 repeats for each subsequent vertically adjacent row of subframes 201 until the entire m row by n column array of subframes 201 is assembled and loaded. Fastening devices 204 secure and stabilize the entire loaded assemble to the ship deck.

Figure 5A:
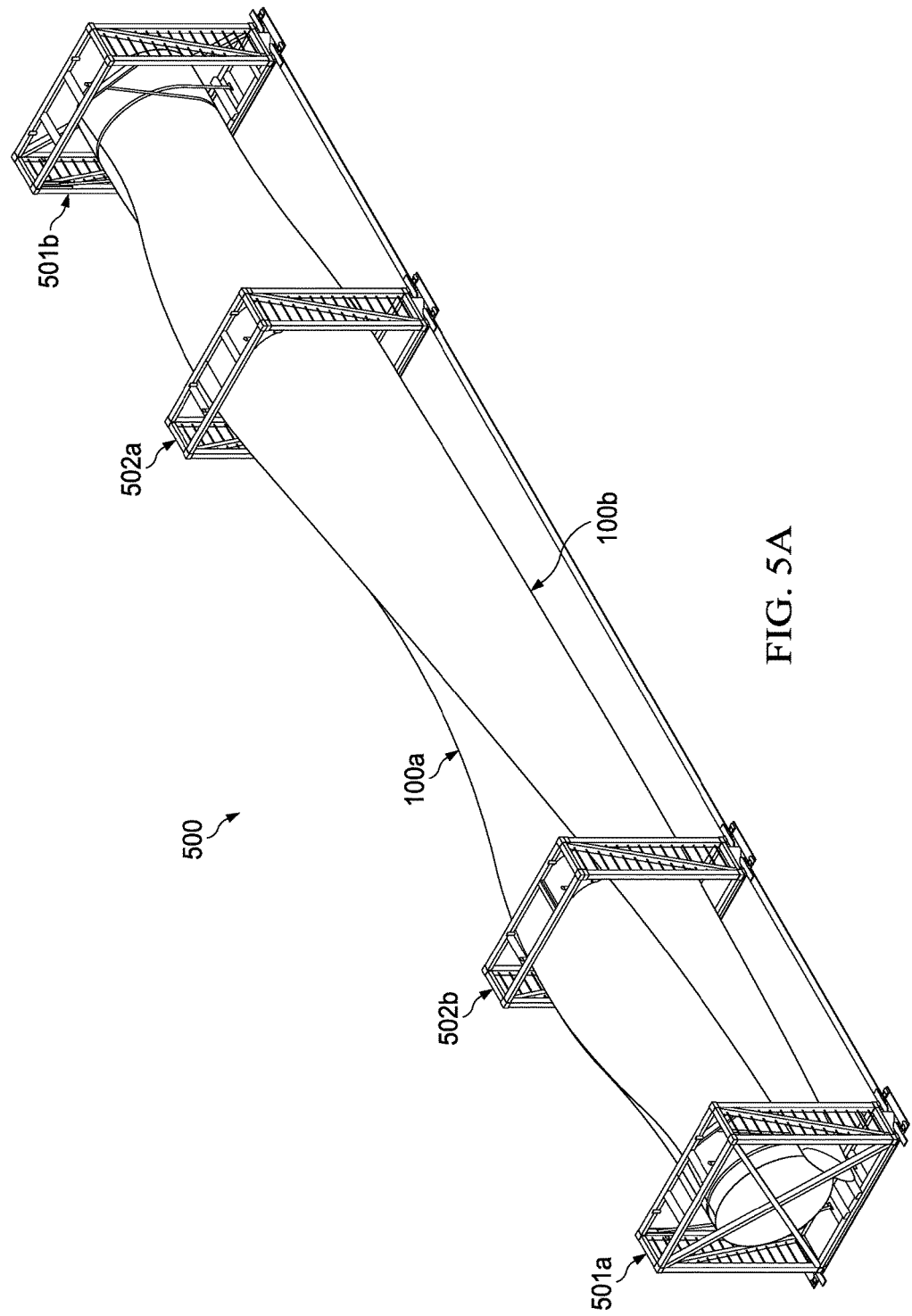
FIG. 5A is a top perspective view of an alternate wind turbine transportation cell (pack) embodying the principles of the present invention, as loaded with a pair of interleaved wind turbine blades.

FIG. 5A is a perspective view of an alternate wind turbine blade transportation cell (pack) 500 according to an alternate embodiment of the principles of the present invention. Wind turbine blade cell 500 includes a pair of opposing root frames 501a and 501b, which are shown respectively securing the cylindrical section 101 of the root of interleaved wind turbine blades 100a-100b. The tip section 103 of wind turbine blade 100a is secured by wind turbine blade tip section support frame 502a and the tip section 103 of wind turbine blade 100b is secured by wind turbine blade tip section support frame 502b.

Figure 5B:
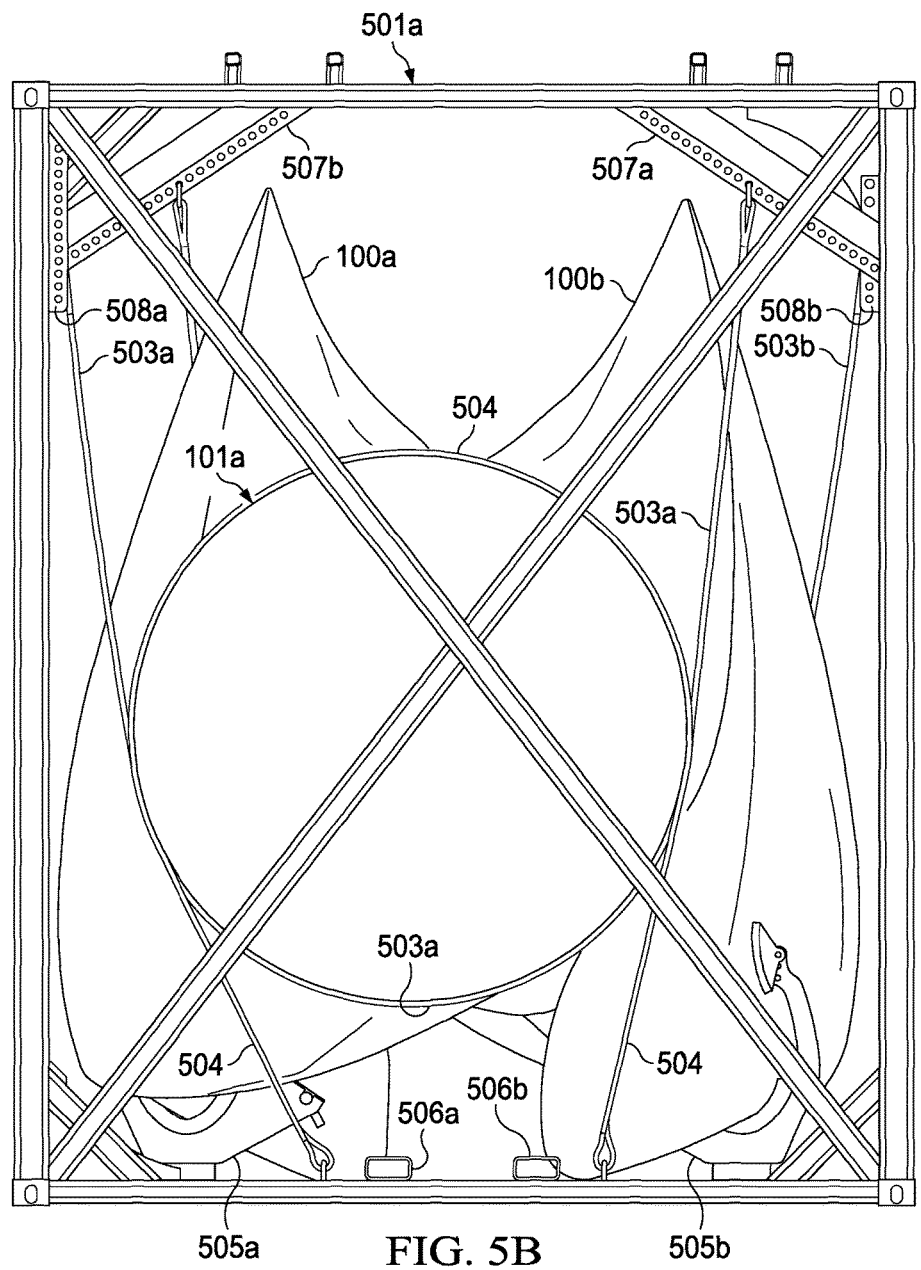
FIG. 5B is an end elevational view of the loaded wind turbine transportation cell of FIG. 5A.

FIG. 5B is an end elevational view taken from the root frame 501a end of wind turbine blade transportation cell 500. As shown in FIG. 5B, a sling 503a loops under and supports the cylindrical section 101 of wind turbine blade 100a. The ends of sling 503 respectively attach to apertures in diagonal support plate 507a and vertical support plate 508a on root frame 501a. A similar sling 503b supports the cylindrical section 101 of wind turbine blade 100b and is attached to apertures in diagonal support plate 507b and vertical support plate 508b on root frame 501b (see FIG. 5A).

A strap 504 loops over the cylindrical section 101 of the root of wind turbine blade 100a. The ends of strap 504 attach to the base of root frame 501a. A similar strap, which is supported on root frame 501b, loops over the cylindrical root section 101 of wind turbine blade 100b (see FIG. 5A).

The tip section of wind turbine blade 101a is retained by blade tip section support structure 505a on wind turbine blade support frame 502a. Each root frame 501 includes a pair of reinforcing members 506a and 506b.

Figure 5C:
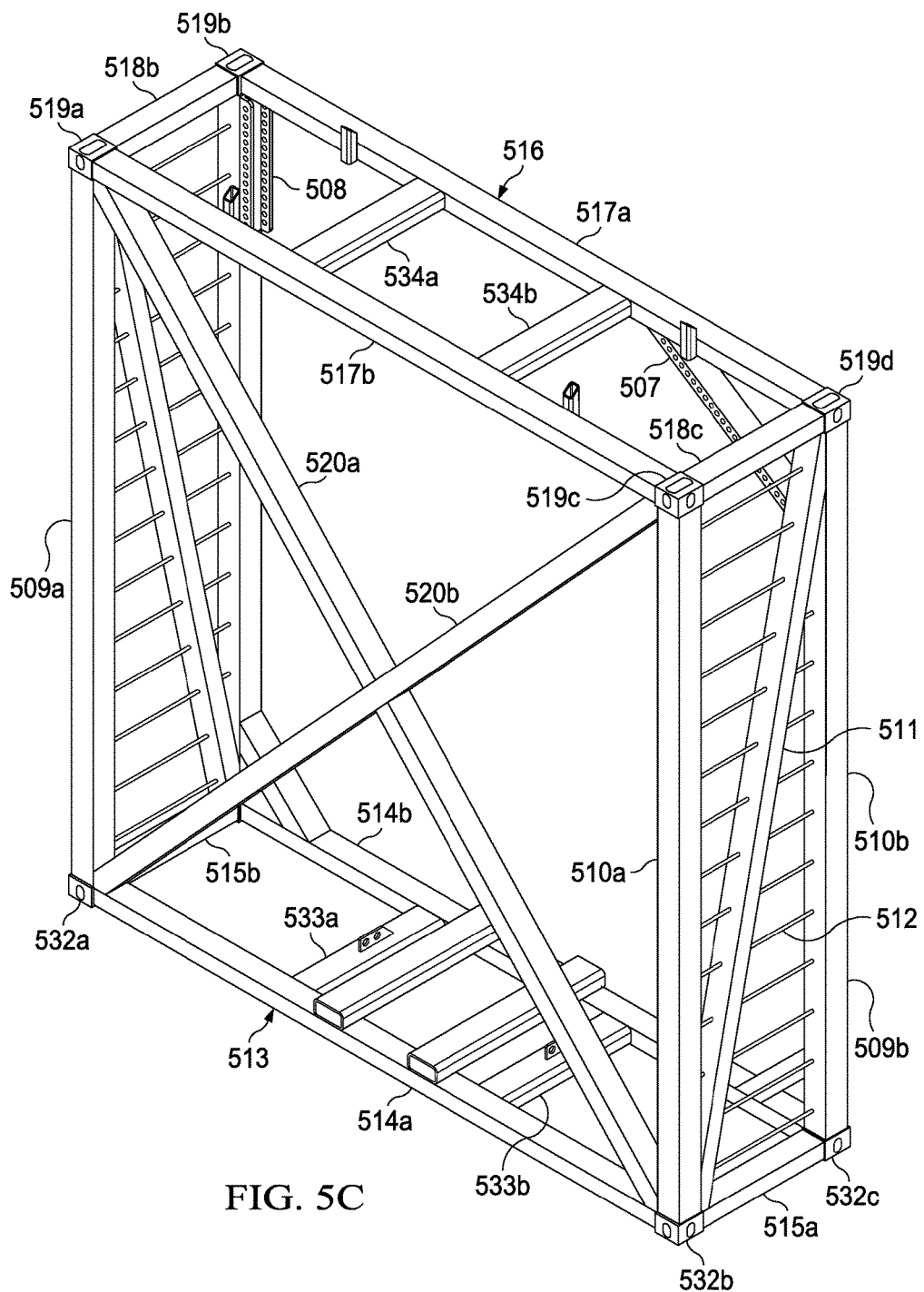
FIG. 5C is a side perspective view of a selected one of the root frames shown in FIG. 5A.

FIG. 5C illustrates the preferred structure of root frames 501, which include a pair of opposing frame sides 509a and 509b. Each frame side 509 is constructed from a pair of parallel vertical members 510a-510b, a diagonal member 511, and a set of horizontal reinforcing members 512 spanning the space between vertical members 510a-510b.

Each root frame 501 also includes a base section 513 having a pair of parallel side members 514a-514b and pair of parallel end members 515a-515b. Four (4) standard ISO 1161 lower container corner fittings 532 are disposed at the lower corners of each root frame 501, with lower corner fittings 532a-532c visible in FIG. 5C. A pair of reinforcing members 533a and 533b are span the space between side members 514a-514b of base section 513 of each root frame 501 and provide points for securing the ends of strap 504 of FIG. 5A.

The upper section 516 of each root frame 501 includes a pair of parallel side members 517a-517b, a pair of parallel end members 518a-518b, and a pair of reinforcing members 534a-534b. Four (4) standard ISO 1161 upper container corner fittings 519a-519d are disposed at the upper corners of each root frame 501.

Figure 5D:
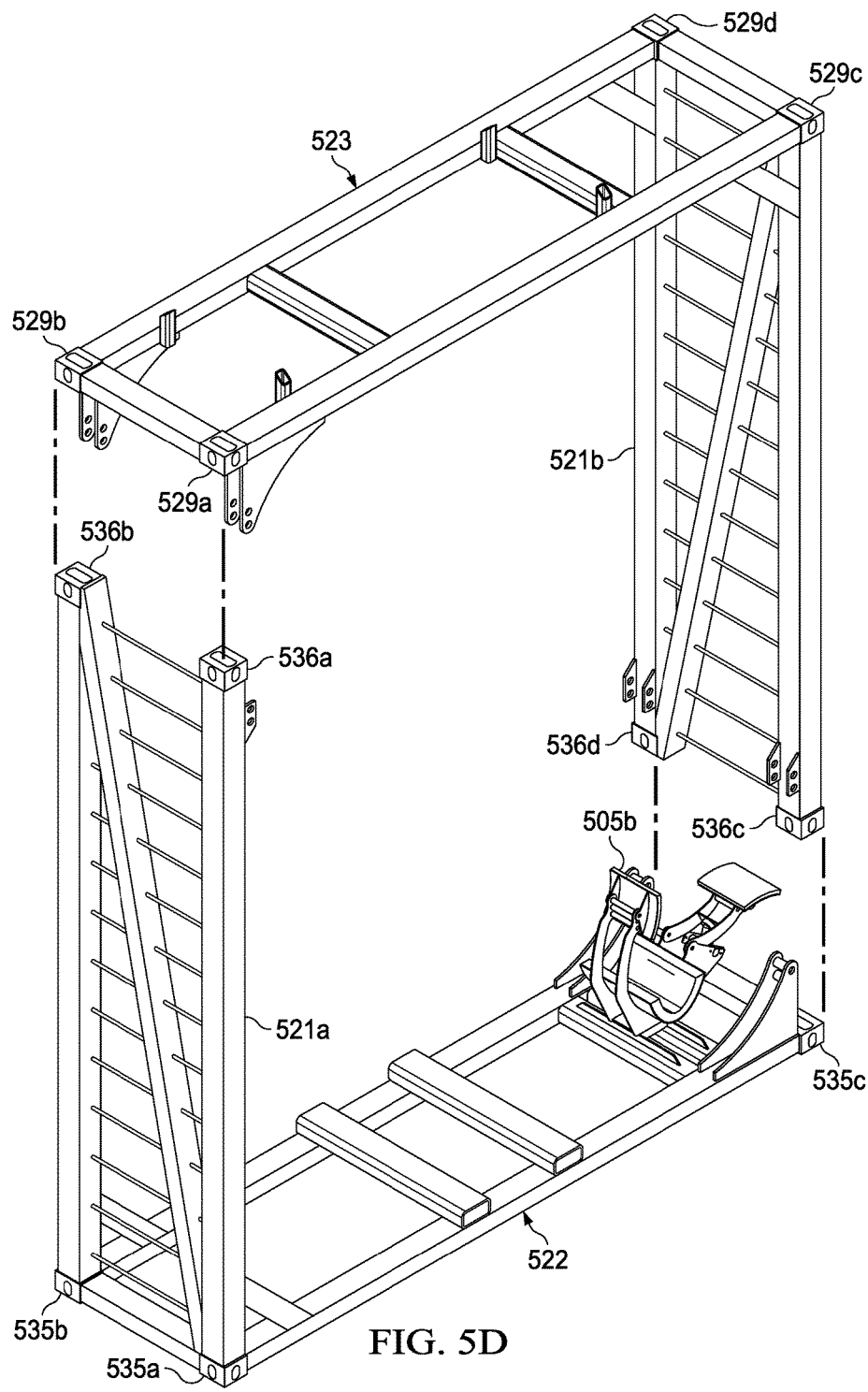
FIG. 5D is a side perspective view of a selected one of the wind turbine blade tip section support frames of FIG. 5A, shown with the upper frame section and one of the side frame sections detached.

A representative wind turbine blade tip section support frame 502 is shown in FIG. 5D. Each wind turbine blade tip section support frame 502 includes opposing frame sides 521a-521b, which are similar in construction to frame sides 509a and 509b of root frames 501, and a base section 522, which is similar in construction to base section 513 of root frames 501. The upper section 523 is similar to uppers section 516 of root frames 501. Each representative wind turbine blade tip section support frame 502 includes four (4) upper standard ISO 1161 container corner fittings 529a-529b and four (4) lower standard ISO 1161 container corner fittings 535, three of which are visible in FIG. 5D at 535a-535c.

In the illustrated embodiment, upper standard corner fittings are 529a and 529b are releasably fastened to frame side 521a by intervening standard corner fittings 536a and 536b and associated twist locks. Similarly, lower standard corner fittings 535c and 535d (not shown) are releasably fastened to frame side 521b by intervening standard corner fittings 536c and 536d and associated twist locks. This configuration allows upper frame section 523 and frame side 521b to be detached from the remainder of wind turbine blade tip section support frames 502 during the loading and unloading of wind turbine blades.

Figure 5E:
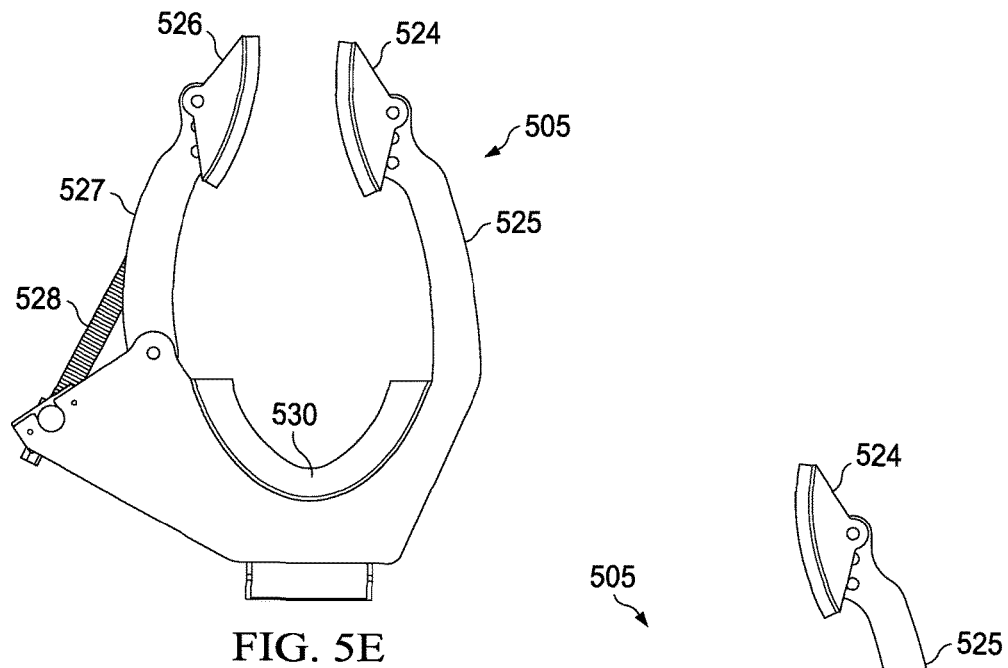
FIG. 5E is an end elevational view of a selected one of the blade tip section support structures of FIGS. 5B and 5D
Figure 5F:
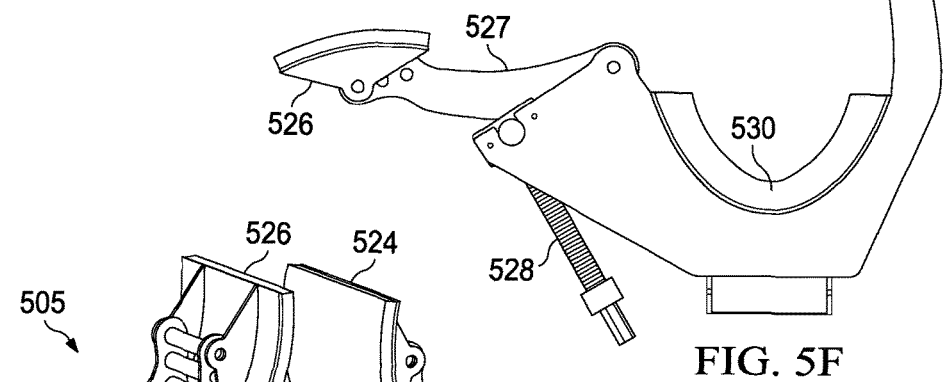
FIG. 5F is an end elevational view of the blade tip section support structure of FIG. 5E, shown in the open position.
Figure 5G:
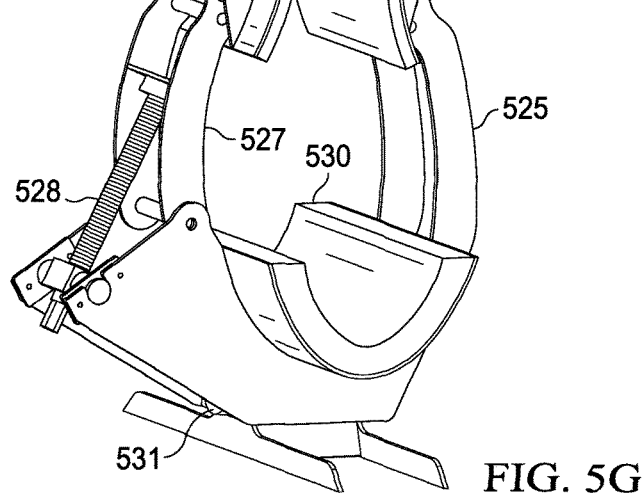
FIG. 5G is an end elevational view of the blade tip section support structure of FIG. 5A, shown in the closed position.

FIGS. 5E-5G shows a representative blade tip section support structure 505 in further detail. Blade tip section support structure 505 is similar in structure and operation to blade tip section support structure 207 discussed above in conjunction with FIGS. 4A-4E, with the primary differences being that blade tip section support structure 505 has one flap fixed flap and one pivoting flap, which pivots in response to a singled threaded screw assembly.

Specifically, blade tip section support structure 505 includes a fixed flap 524 supported on a fixed arm 525 and a pivoting flap 526 supported by a pivoting arm 527. Pivoting flap 526 and pivoting arm 527 pivot in response to torque applied to singled threaded screw assembly 528. FIGS. 5E and 5G show blade tip section support structure 505 in the closed position without a wind turbine blade tip section received in liner 530. FIG. 5F shows blade tip section support structure 505 in the open position in preparation to receive a wind turbine blade tip section.

A hinge 531, supported on the base section 522 of the underlying wind turbine blade tip section support frame 502, allows blade tip section support structure 505 to accommodate wind turbine blades of varying curvatures, as well has helps distribute the weight of the blade tip section across a larger portion of the surface of liner 530.

The principles of the present invention are also embodied in a template system 600 for positioning the root frames 501 and wind turbine blade tip section support frames 502 during the assembly of transportation cell 500. In particular, template system 600 includes root frame placement templates 601*a* and 601*b* for respectively positioning root frames 501*a* and 501*b*. Blade tip section support frame placement templates 602*a* and 602*b* respectively position wind turbine blade tip section support frames 502*a* and 502*b*.

Root frame placement templates 601*a*-601*b* and blade tip section support frame placement templates 602*a*-602*b* are placed on the ground and fastened together with a set of flat steel bars 604*a*-604*f* using bolts or a similar fastening technique. Advantageously, template system can be disassembled for transport and stackers can drive over flat steel bars 604 during transfer of the assembled transportation cell 600.

Figure 6B:
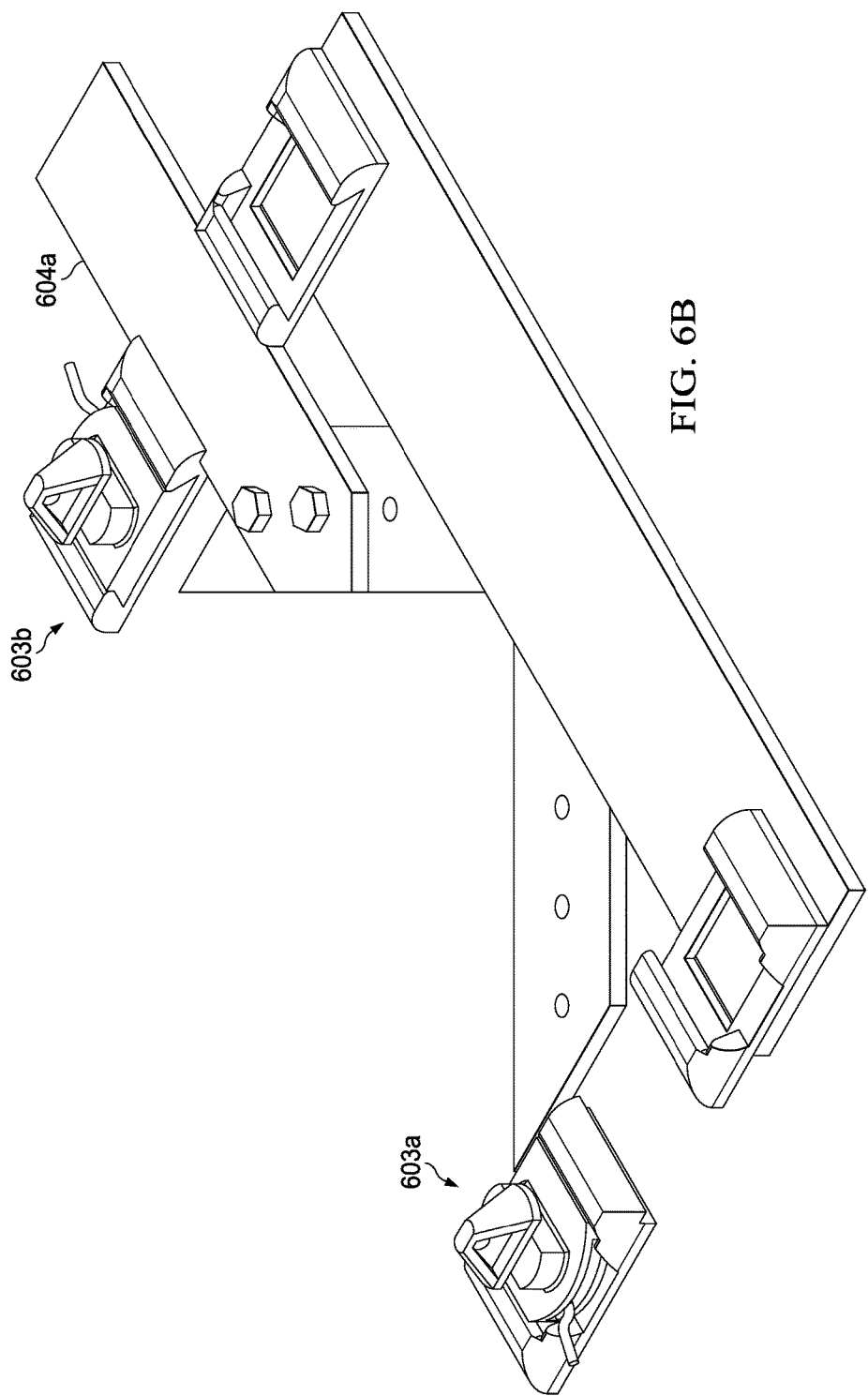
FIG. 6B is a more detailed view of a selected one of a pair of corner twist locks of the position template system of FIG. 6A.

Each root frame template 601 includes four (4) twist locks adapted to mate with lower standard container corner fittings 535*a*-535*d* of the corresponding root frame 501. Similarly, each blade tip section support frame placement template 602 includes four (4) twist locks adapted to mate with the lower standard container corner fittings 532*a*-532*d* of the corresponding wind turbine blade tip section support frame 502. FIG. 6B shows one pair of twist locks 603*a*-603*b* disposed at a pair of longitudinally adjacent corners of root frame placement template 601*a* for reference. The other twist locks at the other corner of root frame template 601*a*, as well as the twist locks at the corners of root frame placement template 601*b* and blade tip section support frame placement templates 602 are similar.

FIG. 6C shows the base section 522 and side 521 of wind turbine blade tip section support frame 502*a* mounted on blade tip section support frame placement template 602*a* and ready to receive the tip section of a wind turbine blade. The configuration of wind turbine blade tip section support frame 502*b* is similar prior to loading. Only after wind turbine blades 100*a*-100*b* are loaded are frame sides 521*b* and upper frames 523 attached to complete the assemblies of wind turbine blade tip section support frames 502*a*-502*b*.

Figure 7A:
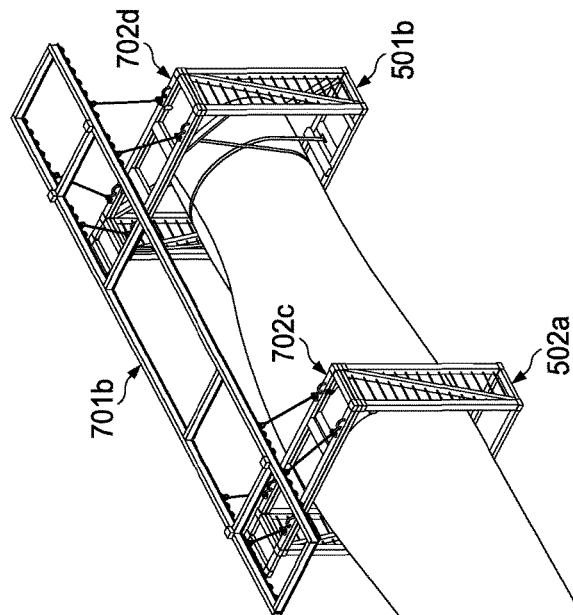
FIG. 7A is a side perspective view of a wind turbine transportation cell loaded with a pair of interleaved wind turbine blades and illustrating the use of a cell handling beam and frame system according to the principles of the present invention.

FIG. 7A is a perspective diagram of loaded transportation cell 500 along with a cell handling system 700 according to the principles of the present invention. Cell handling system 700 includes a pair of handling beams 701*a*-701*b*, each connected to a corresponding pair of handling frames 702*a*-702*b* and 702*c*-702*d* by cables, chains, or ropes. Handling frames 702*a*-702*b* respectively mate with upper corner fittings 519*a*-519*d* of root frame 501*a* and upper corner fittings 529*a*-529*d* of wind turbine blade tip section support frame 502*b*. Handling frames 702*c*-702*d* respectively mate with upper corner fittings 529*a*-529*d* of wind turbine blade tip section support frame 502*a* and upper corner fittings 519*a*-519*d* of root frame 501*b*.

Figure 7B:
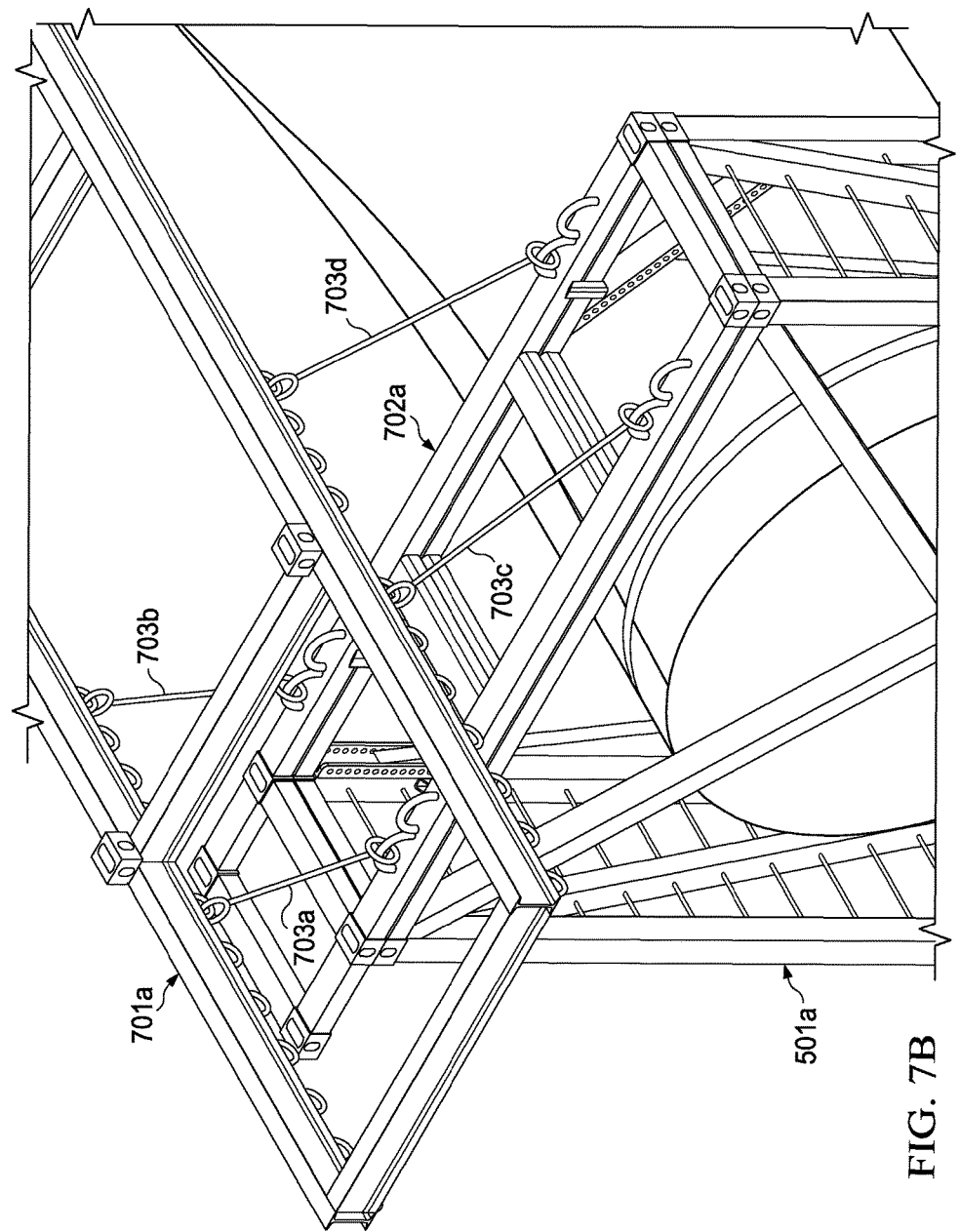
FIG. 7B is more detailed view illustrating the interconnections between a selected one of the root frames of the wind turbine transportation cell of FIG. 7A with the corresponding cell handling frame and corresponding cell handling beam.
Figure 7C:
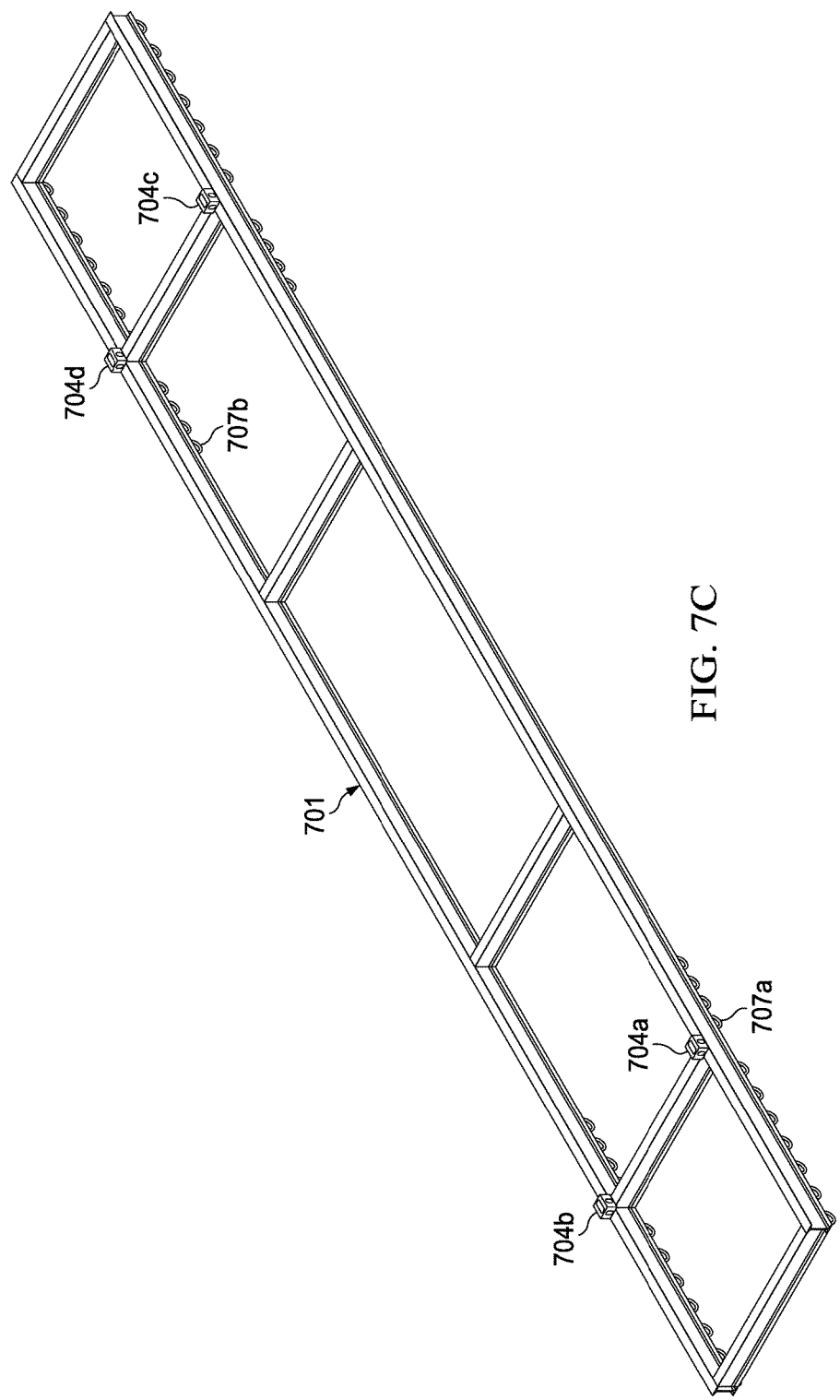
FIG. 7C is a top perspective view of the cell handling beam of FIG. 7A.

FIG. 7B illustrates the interface between handling beam 701*a*, handling frame 702*a*, and root frame 501*a*, which is representative of the remaining interfaces between transportation cell 500 and handling beams 701*a*-701*b*. FIG. 7C depicts the preferred structure of handling beams 701 and FIG. 7D depicts the preferred structure of handling frames 702.

The preferred structure of handling beams 701 shown in FIG. 7C, includes four (4) standard ISO 1161 container corner fittings 704*a*-704*d* spaced to receive the connector twist locks of a standard stacker/crane. Loops, two of which are shown for reference at 707*a* and 707*b*, allow handling frames 702 to be connected at different points along the length of handling beams 701 with chains/cables/ropes 703 to accommodate different configurations of transportation cell 500 required for transporting wind turbine blades of different types and lengths.

Figure 7D:
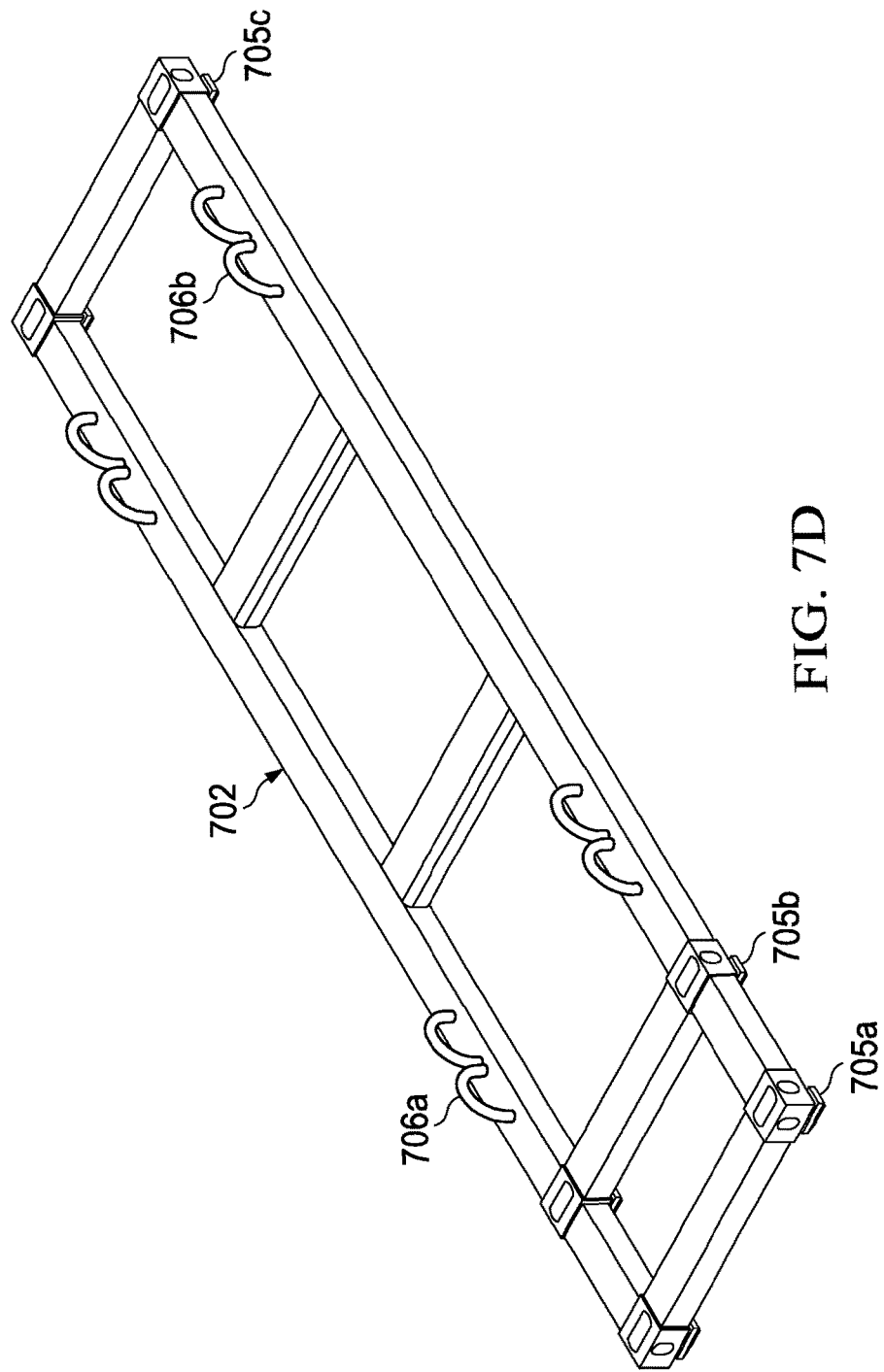
FIG. 7D is a top perspective view of the cell handling frame of FIG. 7A

As shown in FIG. 7D, each handling frame 702 includes three pairs of standard twist locks 705*a*-705*c*, which mate with the corresponding standard upper container corner fittings 519*a*-519*d* of root frames 501*a* and the upper standard corner fittings 529*a*-529*d* of wind turbine blade tip section support frames 502. (Three pairs of twist locks 705*a*-705*b* are provided to accommodate different width root support frames 501 and/or wind turbine blade tip section support frames 502). A number of loops, two of which are shown at 706*a*-706*b*, allow cables/ropes/chains 703*a*-703*d* (FIG. 7B) to be attached to the given handling frame 701.

As shown in FIG. 7B, twist locks 705 on handling frames 702*a*-702*b* mate with the upper standard corner fittings 519*a*-519*d* of root frames 501 and upper standard corner fittings 529*a*-529*d* of wind turbine blade tip section support frames 502. Handling frames 702*a*-702*b* in turn connect to respective ends of handling beam 701 with cables/ropes/chains 703. Preferably, two stackers/or cranes respectively connect to handling beams 701*a* and 701*b*, using the corresponding lifting beam corner fittings 704*a*-704*d*, and are used together to lift loaded transportation cell 500 Advantageously, the configuration of handling system 700 allows the stacker/crane operators to detect when lifting of the two cell ends is out of synchronization.

Figure 8A:
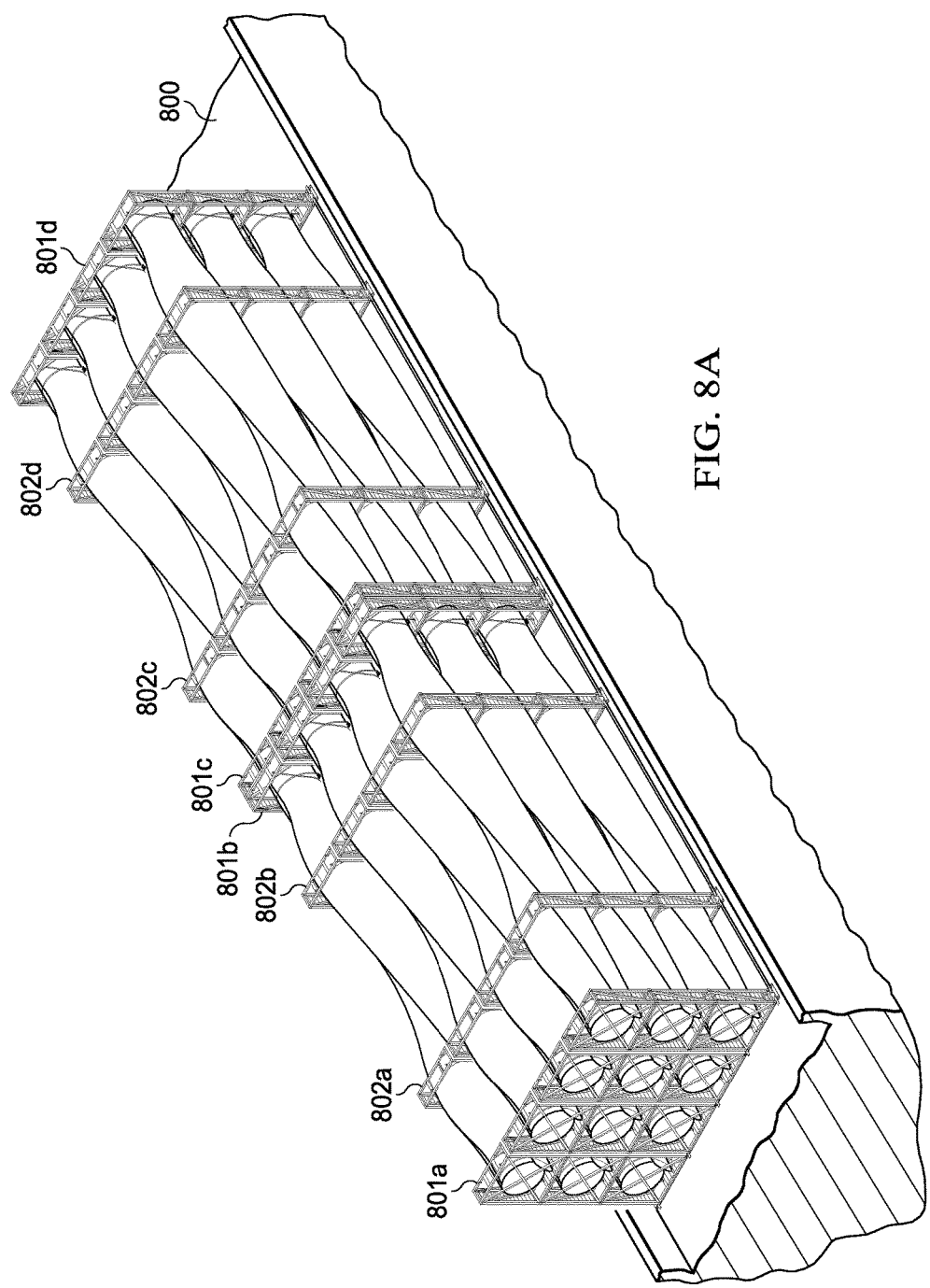
FIG. 8A is a top perspective view of an array the wind turbine transportation cell shown in FIG. 5A each loaded with a pair of interleaved wind turbine blades and fastened to a ship deck for transport.

FIG. 8A shows a typical use of multiple transportation cells 500 in front and rear stacks fastened to a ship deck 800. Similar stacks may be used within the hold of a ship. Moreover, the number of transportation cells 500 in a stack, the number and type of wind turbine blades 100, and so on, may vary in actual wind turbine transportation systems. One technique for forming stacks of transportation cells 500 such as those shown in FIG. 8A is to use cell handling system 700 and a pair of standard stackers/cranes, as discussed above in conjunction with FIGS. 7A-7C.

In the example of FIG. 8A, one stack of transportation cells 500 is a 4×3 stack of twelve (12) cells 500 transporting twenty four (24) wind turbine blades 100. The is stack is supported by 4×3 array 801*a* of root frames 501, 4×3 arrays 802*a* and 802*b* of wind turbine blade tip section support frames 502, and 4×3 array 801*b* of root frames 501. The other stack of transportation cells 500 is a 4×3 stack of twelve (12) cells 500 transporting twenty four (24) wind turbine blades 100. This stack is supported by a 4×3 array 801*c* of root frames 501, 4×3 arrays 802*c* and 802*d* of wind turbine blade tip section support frames 502, and 4×3 array 801*d* of root support frames 501.

In an array, such as one of those shown in FIG. 8A, the lower corner fittings 532*a*-532*d* of root support frames 501 and the lower corner fittings 535*a*-535*d* of wind turbine blade tip section support frames 502 of the lowest row of transportation cells 500 are fastened to deck 800 using standard twist locks or similar devices. Laterally adjacent root support frames 501 within a row are preferably fastened together by fastening together corresponding pairs of laterally adjacent root frame upper corner fittings 519 and corresponding pairs of laterally adjacent root frame lower corner fittings 532. Laterally adjacent wind turbine blade tip section support frames 502 are preferably fastened together by fastening together corresponding pairs of laterally adjacent blade tip section support frame upper corner fittings 529 and corresponding pairs of laterally adjacent blade tip support frame lower corner fittings 533 using standard twist locks or similar devices.

Vertically adjacent pairs of root support frames 501 are preferably fastened together by fastening together the corresponding lower corner fittings 532 of the upper frame of the pair of frames and the corresponding vertically adjacent upper corner fittings 519 of the lower frame of the pair of frames with twist locks or a similar device. Similar, vertically adjacent pairs of wind turbine blade tip section support frames 502 are preferably fastened together by fastening together corresponding lower corner fittings 535 of the upper frame of the pair of frames with the corresponding vertically adjacent upper corner fittings 529 of the pair of frames using twist locks or a similar device.

Figure 8B:
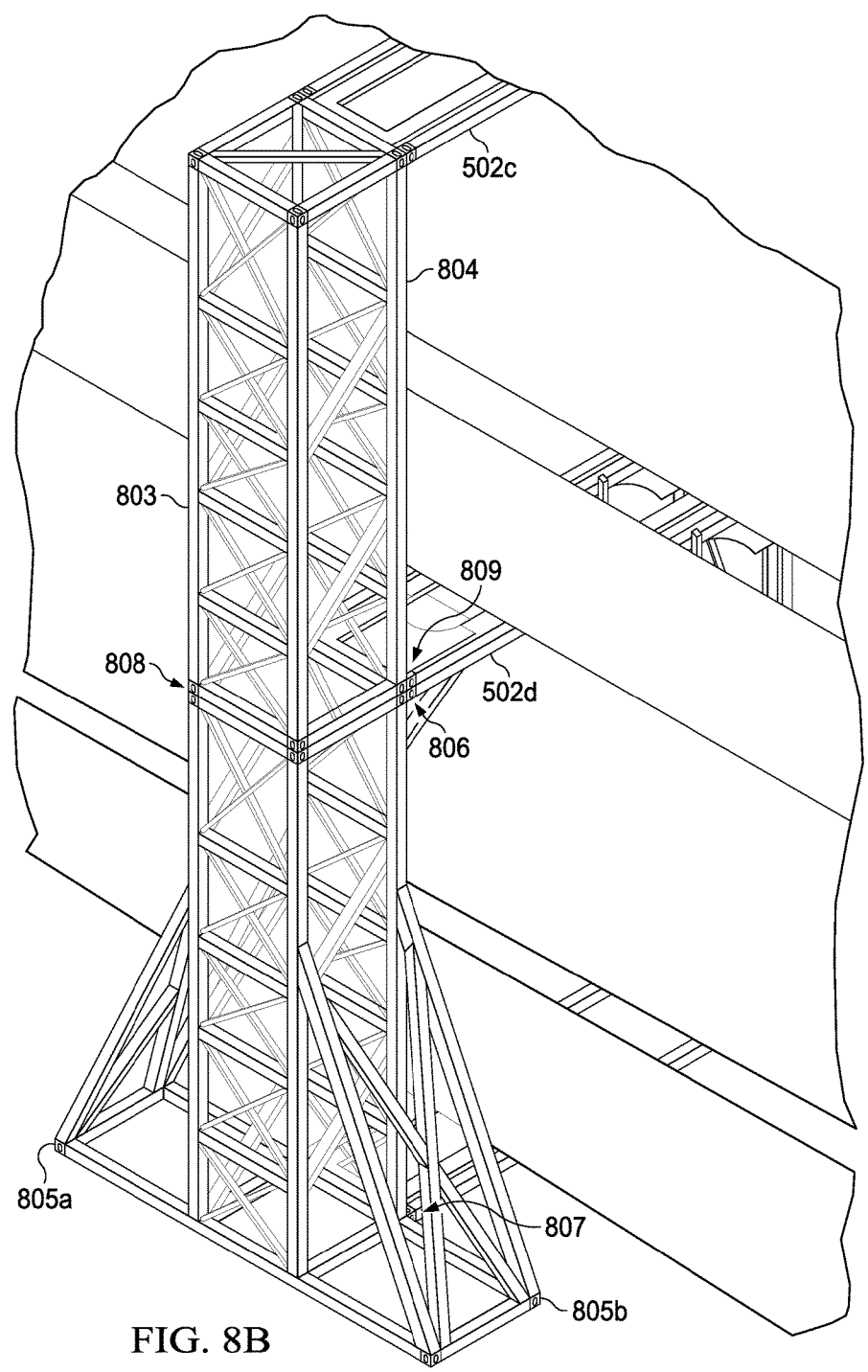
FIG. 8B is a more detailed view of a pair of stacked blade tip section support frames along with support (reinforcing) tower according to the principles of the present invention.
Figure 8C:
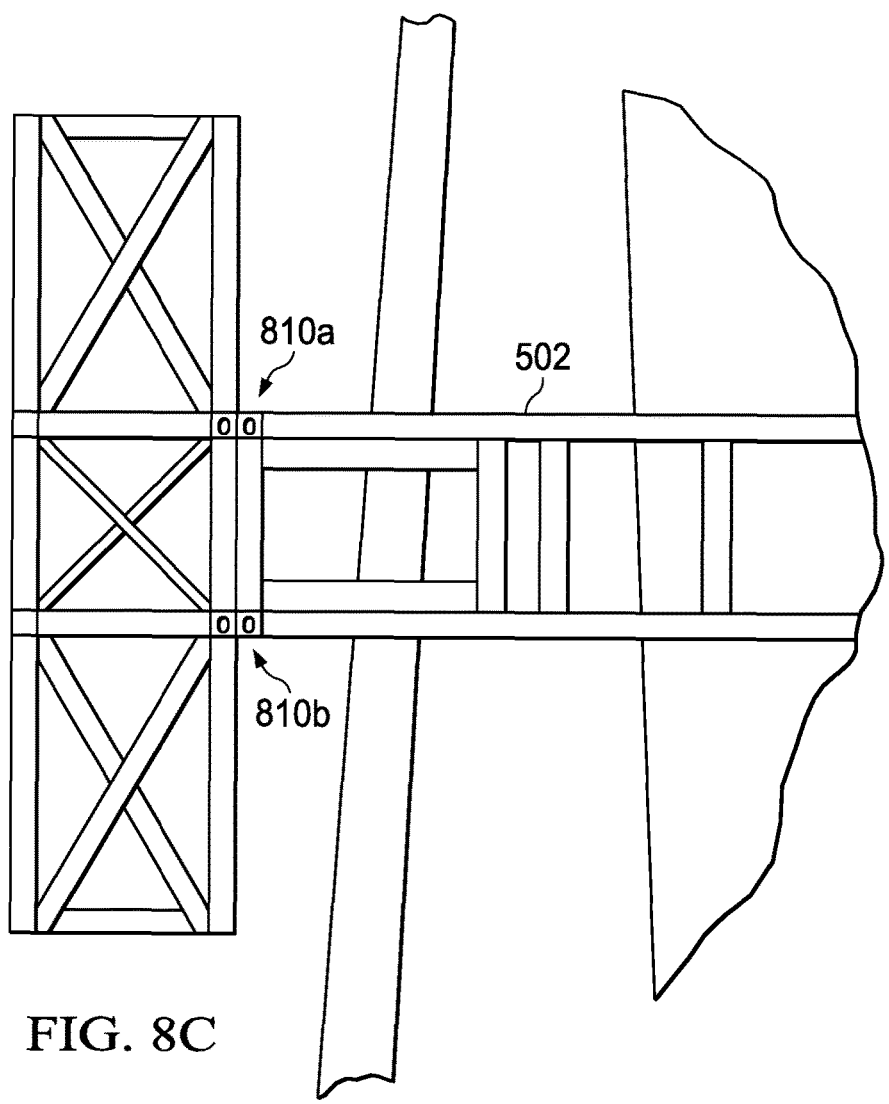
FIG. 8C is a more detailed view of the twist lock connections between the support frame and the blade tip section support frames of FIG. 8B.

FIGS. 8B and 8C illustrate a further feature according to the present inventive principles. In particular, FIG. 8B shows a pair of vertically adjacent wind turbine blade tip section support frames 502 such as found at the lateral exterior of one of the columns of arrays 802 of FIG. 8A. Generally, a tower of reinforcing frames are fastened laterally adjacent the lateral exterior sides of a given array of wind turbine blade tip section support frames 502. Advantageously, these reinforcing towers stiffen the array of wind turbine blade tip section support frames 502, as well as reduce the amount of required lashing by chains, cables, or ropes.

A lower support frame 803 with a broad base includes a set of standard corner fittings attached to a ship deck by a corresponding set of standard twist locks, two of these interconnection points are shown for reference at 805*a*-805*b*. The top of lower support frame 803 includes a pair of standard corner fittings, which mate with a corresponding pair of upper corner fittings 529 on the laterally adjacent lower wind turbine blade tip section support frame 502*d* using standard twist locks. One such connection point is shown in FIG. 8B at 806. The bottom of lower support frame 803 includes a pair of standard corner fittings, which mate with a corresponding pair of lower corner fittings 535 on the laterally adjacent lower wind turbine blade tip section support frame 502*d* using standard twist locks. One such connection point is shown in FIG. 8B at 807.

Four (4) lower standard corner fittings of an upper support frame 804 mate with four (4) upper standard corner fittings of lower support frame 803 with standard twist locks. One of these interconnection points is shown at 808 FIG. 8A. In addition, two (2) of the lower standard corner fittings of upper support frame 804 mate with two (2) corresponding corner fitting lower corner fittings 533 of the laterally adjacent upper wind turbine blade tip section support frame 502*c*, including the interconnection at point 809.

As shown in FIG. 8A, and in further detail in FIG. 8B, two (2) upper standard corner fittings of upper support frame 804 mate with two (2) corresponding upper corner fittings 529 of adjacent upper wind turbine blade tip section support frame 502*c* at points 810*a* and 810*b*.

As additional transportation cells 500 are loaded, additional upper support frames 804 are added to the tower and connect with the immediately lower upper support frame 804 and the laterally adjacent wind turbine blade tip section support frames 502 using the corresponding standard corner fittings and standard twist locks.

Wind turbine blade packs embodying the principles of the present invention realize substantial advantages over the prior art. Among other things, by packing the wind turbine blades with their edges disposed vertically, not only is the packing density increased, but the wind turbine blades are now in a position better suited to withstand the forces applied during a typical sea journey. In addition, the stability provide by the structure of the wind turbine blade pack allows for a substantial reduction in the number of cables, chains, and composite fiber lines that are required to secure and stabilize each wind turbine blade to the ship deck.

Moreover, the use of wind turbine blade packs according to the present principles reduces or eliminates the need for the fixtures normally required for transporting wind turbine blades. In turn the expenses incurred from lost or discarded fixture components is advantageously reduced.

Furthermore, the embodiments of the present invention are modular and scalable. By varying the distances between end and middle frames, wind turbine blades having different lengths and/or having reinforced tip sections in different locations can be accommodated. Different arrays of subframes can be assembled as needed to transport a particular number of wind turbine blades and/or to meet constraints such as limitation on the deck or hold space available. When not in use transporting wind turbine blades, the structural components of the wind turbine packs can be disassembled for transportation and storage in a standard air-sea transportation container.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A transportation cell system for transporting wind turbine blades, which is adapted for interconnection with adjacent transportation cells, comprising:

a first support structure for supporting a cylindrical root section of a wind turbine blade and a second support structure aligned with and spaced from the first support structure for supporting a tip section of the wind turbine blade, each of the first and second support structures comprising:

a substantially rectangular upper frame spaced from an opposing substantially rectangular lower frame by first and second opposing substantially rectangular side frames;

a first pair of upper corner fittings disposed at a corner of a first end of the upper frame and a first end of the first side frame and a second pair of upper corner fittings disposed at a corner of a second end of the upper frame and a first end of the second side frame; and a first pair of lower corner fittings disposed at a corner of a first end of the lower frame and a second end of the first side frame and a second pair of lower corner fittings disposed at a corner of a second end of the lower frame and a second end of the second side frame, and wherein at least one of said first pair of upper corner fittings and at least one of said second pair of upper corner fittings are configured to interconnect with an adjacent transportation cell to thereby implement interconnection of an array of transportation cells, and wherein the second support structure further includes;

a third pair of upper corner fittings for releasably coupling the first pair of upper corner fittings with the first end of the first side frame;

a third pair of lower corner fittings for releasably coupling the second pair of lower fittings with the second end of the second side frame; and wherein the third pair of upper corner fittings and the third pair of lower corner fittings allow the upper frame and the second side frame to be released as a unit from the lower frame and the first side frame.

2. The system of claim 1, further comprising:

a third support structure disposed horizontally between the first and second support structures for supporting a tip section of another wind turbine blade; and a fourth support structure spaced from and aligned with the third support structure for supporting a cylindrical root section of the another wind turbine blade, wherein the wind turbine blade and the another wind turbine blades extend with an edge-vertical orientation in opposing directions such that a tip of the wind turbine blade is disposed adjacent the cylindrical root section of the another wind turbine blade and a tip of the another wind turbine blade is disposed adjacent the cylindrical root section of the wind turbine blade.

3. The system of claim 2, wherein each of the third and fourth support structures comprises:

a substantially rectangular upper frame spaced from an opposing substantially rectangular lower frame by first and second opposing substantially rectangular side frames;

a first pair of upper corner fittings disposed at a corner of a first end of the upper frame and a first end of the first side frame and a second pair of upper corner fittings disposed at a corner of a second end of the upper frame and a first end of the second side frame; and a first pair of lower corner fittings disposed at a corner of a first end of the lower frame and a second end of the first side frame and a second pair of lower corner fittings disposed at a corner of a second end of the lower frame and a second end of the second side frame.

4. The system of claim 3, wherein the third support structure further comprises:

a third pair of upper corner fittings for releasably coupling the first pair of upper corner fittings with the first end of the first side frame;

a third pair of lower corner fittings for releasably coupling the second pair of lower fittings with the second end of the second side frame; and wherein the third pair of upper corner fittings and the third pair of lower corner fittings allow the upper frame and the second side frame to be released as a unit from the lower frame and the first side frame.

5. The system of claim 1, wherein the first support structure supports a sling for supporting the cylindrical root section of the wind turbine blade.

6. The system of claim 1, wherein the second support structure comprises a clamping assembly for clamping a selected point on the wind turbine blade tip section.

7. The system of claim 1, further comprising:

a corresponding pair of twist locks for releasably coupling the first pair of upper corner fittings with the third pair of upper corner fittings;

a corresponding pair of twist locks for releasably coupling the second pair of upper corner fittings with the third pair of lower corner fittings.

8. A transportation cell system for transporting wind turbine blades, which is adapted for interconnection with adjacent transportation cells, comprising:

a root support structure for supporting a cylindrical root section of a first wind turbine blade, comprising:

an upper frame including a plurality of upper corner fittings;

a lower frame including a plurality of lower corner fittings;

a first side frame extending between the upper and lower corner fittings at a first end of the upper and lower frames; and a second side frame extending between the upper and lower corner fittings at a second end of the upper and lower frames; and a tip support structure for supporting a tip section of a second wind turbine blade horizontally interleaved with the first wind turbine blade, comprising:

an upper frame including a plurality of upper corner fittings;

a lower frame including a plurality of lower corner fittings;

a first side frame extending between the upper and lower corner fittings at a first end of the upper and lower frames and wherein;

a second side frame extending between the upper and lower corner fittings at a second end of the upper and lower frames;

the first side frame of the tip support structure is releasably coupled with the upper corner fittings of the upper frame of the tip support structure; and the second side frame of the tip support structure is releasably coupled with the lower corner fittings of the lower frame of the tip support structure, wherein the upper frame and second side frame of the tip support structure can be detached from the lower frame and first side frame of the tip support structure.

9. The system of claim 8, further comprising:

a first handling frame having a plurality of corner fittings adapted to couple with the plurality of upper corner fittings of the upper frame of the root support structure;

a second handling frame having a plurality of corner fittings adapted to couple with the plurality of upper corner fittings of the upper frame of the tip support structure; and a handling beam coupled to the first and second handling frames for lifting the root and tip support structures when the plurality of corner fittings of the first handling frame are coupled to the plurality of upper corner fittings of the upper frame of the root support structure and the plurality of corner fittings of the second handling frame are coupled to the plurality of upper corner fittings of the upper frame of tip support structure.

10. The system of claim 9, wherein the handling beam is coupled to the first and second handling frames by a selected one of a chain, a cable, or a rope.

11. The system of claim 10, further comprising:

second root support structure for supporting a cylindrical root section of the second wind turbine blade, comprising:

an upper frame including a plurality of upper corner fittings;

a lower frame including a plurality of lower corner fittings;

a first side frame extending between the plurality of upper corner fittings and the plurality of lower corner fittings at a first end of the upper frame and the lower frame; and a second side frame extending between the plurality of upper corner fittings and the plurality of lower corner fittings at a second end of the upper frame and the lower frame; and a second tip support structure for supporting a tip section of the first wind turbine blade, comprising:

an upper frame including a plurality of upper corner fittings, a lower frame including a plurality of lower corner fittings;

a first side frame extending between the plurality of upper corner fittings and the plurality of lower corner fittings at a first end of the upper frame and the lower frame; and a second side frame extending between the plurality of upper corner fittings and the plurality of lower corner fittings at a second end of the upper frame and lower frame.

12. The system of claim 11, further comprising:

a third handling frame having a plurality of corner fittings adapted to couple with the plurality of upper corner fittings of the upper frame of the second root support structure;

a fourth handling frame having a plurality of corner fittings adapted to couple with the plurality of upper corner fittings of the upper frame of the second tip support structure; and a second handling beam coupled to the third and fourth handling frames for lifting the second root and second tip support structures when the plurality of corner fittings of the third handling frame are coupled to the plurality of upper corner fittings of the upper frame of the second root support structure and the plurality of corner fittings of the fourth handling frame are coupled to the plurality of upper corner fittings of the upper frame of the second tip support structure.

13. The system of claim 8, further comprising a template system for defining relative positions of the root support structure and the tip support structure, comprising:

a first template frame having a plurality of twist locks for engaging the lower fittings of the lower frame of the root support structure;

a second template frame having a plurality of twist locks for engaging the lower fittings of the lower frame of the tip support structure; and a first bar coupling a first end of the first template frame with a first end of the second template frame; and a second bar coupling a second end of the first template frame with a second end of the second template frame.

14. The system of claim 8, wherein:

the first side frame of the tip support structure is releasably coupled with the upper corner fittings of the upper frame of the tip support structure with a corner fitting and a twist lock; and the second side frame of the tip support structure is releasably coupled with the lower corner fittings of the lower frame of the tip support structure with a corner fitting and a twist lock.

\* \* \* \* \*